US009151819B2

(12) United States Patent
Bonnefoy et al.

(10) Patent No.: US 9,151,819 B2
(45) Date of Patent: Oct. 6, 2015

(54) ANTENNA APPARATUS FOR DETERMINING THE POSITION OF A RADIO-FREQUENCY TRANSPONDER

(75) Inventors: Pierre Bonnefoy, Aix en provence (FR); Benjamin Limongi, Aix en provence (FR)

(73) Assignee: PSION INC., Mississauga, Ontario (CA)

( * ) Notice: Subject to any disclaimer, the term of this patent is extended or adjusted under 35 U.S.C. 154(b) by 326 days.

(21) Appl. No.: 13/179,237

(22) Filed: Jul. 8, 2011

(65) Prior Publication Data

US 2013/0009820 A1    Jan. 10, 2013

(51) Int. Cl.
  *G01S 3/10* (2006.01)
  *H01Q 1/22* (2006.01)
  *H01Q 21/00* (2006.01)
  *G01S 3/40* (2006.01)

(52) U.S. Cl.
  CPC .............. *G01S 3/40* (2013.01); *H01Q 1/2208* (2013.01); *H01Q 21/00* (2013.01)

(58) Field of Classification Search
  USPC .................................................. 342/368, 417
  IPC ....................................................... G01S 3/40
  See application file for complete search history.

(56) References Cited

U.S. PATENT DOCUMENTS

| 2,871,476 | A | * | 1/1959 | Busignies | 342/441 |
| 3,328,794 | A | * | 6/1967 | Baltzer | 342/62 |
| 3,733,603 | A | * | 5/1973 | Johnston | 342/192 |
| 4,219,821 | A | * | 8/1980 | Selim | 342/445 |
| 4,656,480 | A | * | 4/1987 | Allezard et al. | 342/151 |
| 4,823,138 | A | * | 4/1989 | Shibano et al. | 342/457 |
| 4,833,481 | A | * | 5/1989 | Shibano et al. | 342/457 |
| 5,280,293 | A | * | 1/1994 | Tong | 342/417 |
| 2004/0038713 | A1 | * | 2/2004 | Okawa et al. | 455/561 |
| 2004/0235497 | A1 | * | 11/2004 | Zekavat | 455/456.1 |
| 2008/0252524 | A1 | * | 10/2008 | Chu et al. | 342/375 |
| 2009/0173820 | A1 | * | 7/2009 | Bock | 244/3.15 |
| 2009/0232023 | A1 | * | 9/2009 | Soffer et al. | 370/254 |
| 2009/0315759 | A1 | * | 12/2009 | Mak et al. | 342/147 |
| 2010/0127875 | A1 | * | 5/2010 | Wong | 340/572.7 |
| 2011/0068980 | A1 | * | 3/2011 | Vered et al. | 342/432 |
| 2012/0258741 | A1 | * | 10/2012 | Tillson et al. | 455/457 |

OTHER PUBLICATIONS

Minimum (plural minima). (2008). In The Penguin Dictionary of Mathematics. Retrieved from http://www.credoreference.com/entry/penguinmath/minimum_plural_minima.*
E.W. Weisstein, "Minimum." Wolfram MathWorld, http://mathworld.wolfram.com/Minimum.html, accessed Sep. 20, 2013.*

(Continued)

*Primary Examiner* — Tashiana Adams
*Assistant Examiner* — Fred H Mull

(57) ABSTRACT

An antenna apparatus for determining the position of a radio-frequency transponder is provided, comprising a phased array of antennas enabled to transmit and receive power at a given frequency for communicating with a radio frequency (RF) transponder, the phased array being movable; and a phase shifter for providing a phase shift to at least one antenna of the phased array to provide a minima in a main radiated lobe of the phased array, such that when the phased array is moved from a first position, for detecting the RF transponder via the main radiated lobe, to a second position, where a signal from the RF transponder is minimized, a position of the RF transponder determined to be along an axis of the minima in the second position.

16 Claims, 21 Drawing Sheets

(56) References Cited

OTHER PUBLICATIONS

M.L. Burrows, Closer Spacing of Geostationary Satellites through Adaptive Nulling at the Ground Terminal, IEEE Transactions on Antennas and Propagation, vol. 35(7), p. 870-873, Jul. 1987.*

Communication. (2001). In Hargrave's communications dictionary, Wiley. Retrieved from http://search.credoreference.com/content/entry/hargravecomms/communication/0.*

Main lobe. (2001). In Hargrave's communications dictionary, Wiley. Retrieved from http://search.credoreference.com/content/entry/hargravecomms/main_lobe/0.*

D.M. Dobkin, The RF in RFID: Physical layer operation of passive UHF tags and readers, http://www.enigmatic-consulting.com/Communications_articles/RFID/RFID_frequencies.html, Oct. 2005.*

Ultra high frequency (UHF). (1999). In Focal dictionary of telecommunications, focal press. Retrieved from http://search.credoreference.com/content/entry/bhfidt/ultra_high_frequency_uhf/0.*

Indicate. (2011). The American Heritage Dictionary of the English Language. Boston, MA: Houghton Mifflin. Retrieved from http://search.credoreference.com/content/entry/hmdictenglang/indicate/0.*

\* cited by examiner

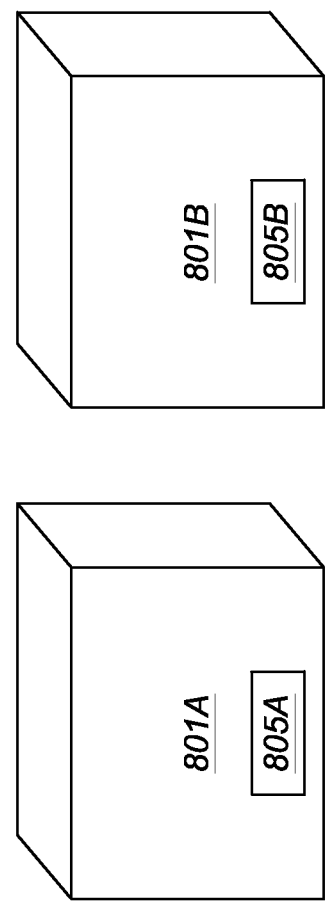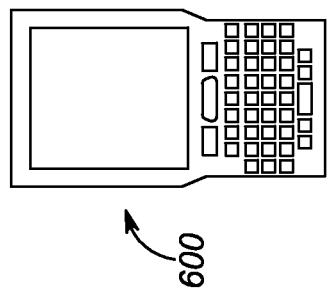
FIG. 8

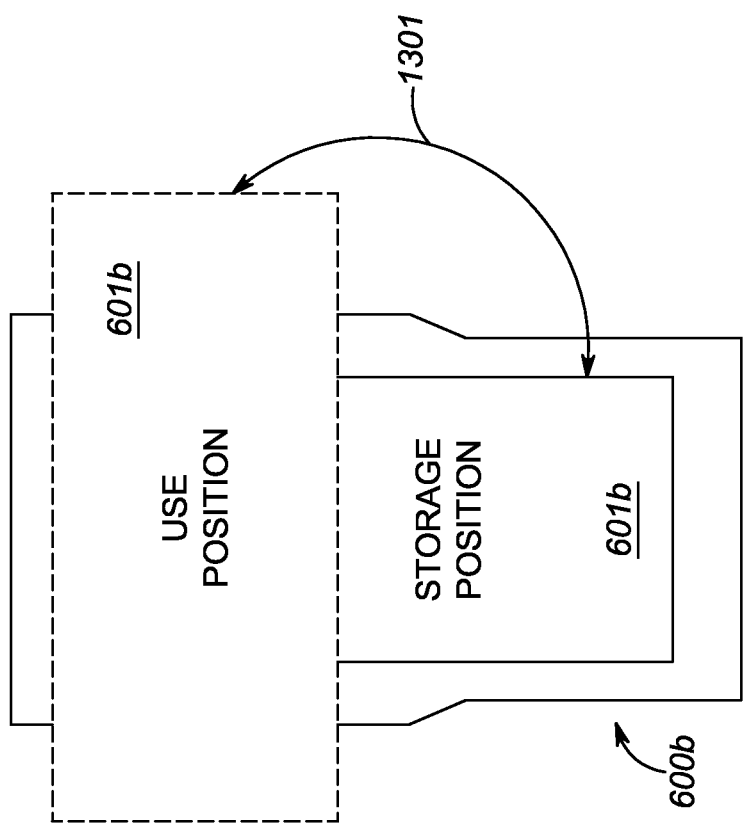

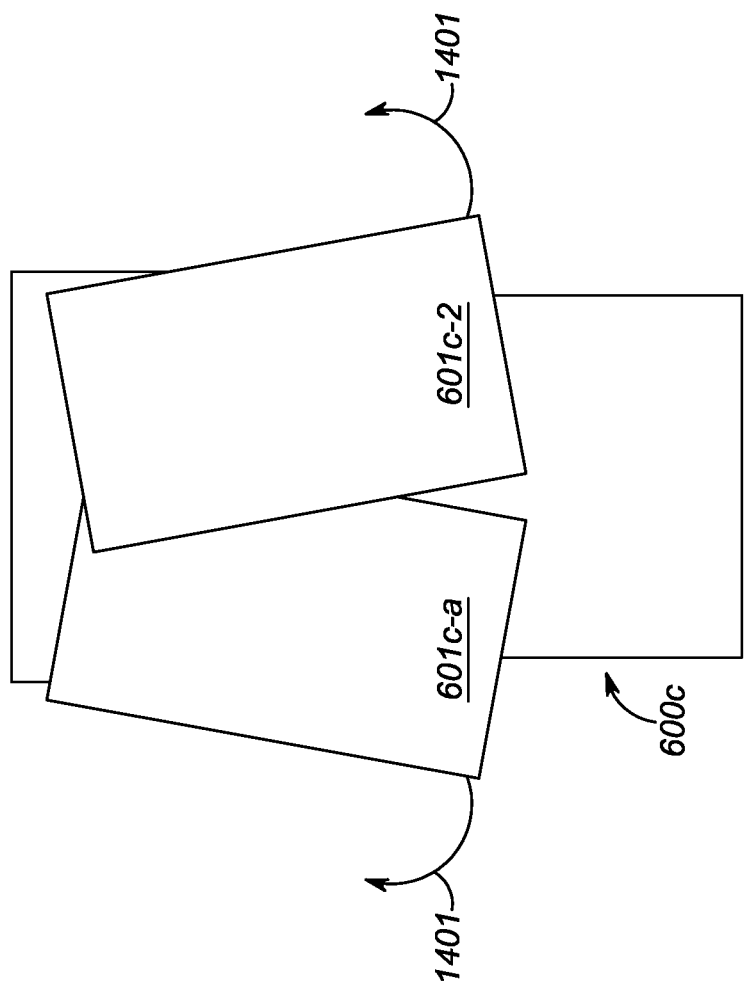

ANTENNA APPARATUS FOR DETERMINING THE POSITION OF A RADIO-FREQUENCY TRANSPONDER

FIELD

The specification relates generally to phased array antennas, and specifically to an antenna apparatus for determining the position of a radio-frequency transponder.

BACKGROUND

Information from radio-frequency (RF) transponders, such as RFID tags, are detected and read using antennas. However, antenna radiation patterns tend to be uniform such that the position of detected RF transponders is ambiguous. For example, RFID detectors simply read any RFID tags within a given range, but there is no directivity information, because the antenna radiated pattern of an RFID detector is large. Hence, for example, when an RFID detector detects an RFID tag, there is no information provided on where the RFID tag might be located. Hence, in warehousing situations for example, an operator trying to locate a given RFID tag (e.g. attached to a pallet), currently is provided with no indication as to where the given RFID might be located, which is highly inconvenient when trying to locate items.

SUMMARY

An aspect of the specification provides an antenna apparatus comprising: a phased array of antennas enabled to transmit and receive power at a given frequency for communicating with a radio frequency (RF) transponder, the phased array being movable; and, a phase shifter for providing a phase shift to at least one antenna of the phased array to provide a minima in a main radiated lobe of the phased array, such that when the phased array is moved from a first position, for detecting the RF transponder via the main radiated lobe, to a second position, where a signal from the RF transponder is minimized, a position of the RF transponder determined to be along an axis of the minima in the second position.

The minima can comprise a null and no response is received from the RF transponder when the RF transponder is located along the axis of the minima in the second position.

The phase shift can be approximately 180°. The phased array can comprise a first pair of antennas, wherein the centers thereof are separated by approximately half of a wavelength associated with the given frequency. The phased array can further comprise a second pair of antennas laterally displaced from the first pair, one antenna of the second pair enabled to be out of phase with the remaining antenna of the second pair providing a second minima in the main radiated lobe perpendicular to the minima such that the RF transponder can be located in at least two spatial dimensions.

The antenna apparatus can further comprise: at least at least one RF transceiver for powering the phased array. The at least one RF transceiver can be common to all antennas of the phased array; the antenna apparatus can further comprise a power splitter for splitting power from the at least one RF transceiver to all the antennas of the phased array.

The antenna apparatus can further comprise a processor for determining when the signal from the RF transponder is minimized, and in response providing an indication of the location of the RF transponder. Providing the indication of the location of the RF transponder can comprise at least one of: rendering visual indicator at a display to indicate the location; controlling a speaker to provide an aural indicator to indicate the location; controlling a light to indicate the location; controlling a haptic device to indicate the location; and, controlling a laser device to indicate the location.

The phase shifter can be configured to be enabled and disabled such that the minima can be turned on and off, and such that the RF transponder can be detected in the first position with the phase shifter disabled and the minima removed, and the position of the RF transponder determined in the second position with the phase shifter enabled and the minima turned on.

For detecting the RF transponder in the first position, a given antenna of the phased array can be enabled to be on while remaining antennas are enabled to be off in the first position, thereby turning the minima off, and in the second position, the remaining antennas can be further enabled to be on, with the at least one antenna phase shifted, thereby turning the minima on.

The antenna apparatus can further comprise a handheld device for providing data received in the signal from the RF transponder and providing an indication of the position of the RF transponder at a display, the phased array integrated with the handheld device.

The given frequency can be in at least one of a range of 300 MHz and 100 GHz, and a range of 800 MHz to 950 MHz.

Another aspect of the specification provides a method comprising: detecting an RF transponder via a main radiated lobe of a phased array of antennas in a first position, the phased array enabled to transmit and receive power at a given UHF (ultra high frequency) frequency for communicating with the RFID (radio frequency identification) tag, the phased array being moveable; and, determining a position of the RF transponder when the phased array is moved to a second position where a signal from the RF transponder is minimized, at least one antenna of the phased array phase shifted using a phase shifter to provide a minima in the main radiated lobe, the position of the RF transponder determined to be along an axis of the minima in the second position.

The method can further comprise providing an indication of the position of the RF transponder. Providing the indication of the location of the RF transponder can comprise at least one of: rendering visual indicator at a display to indicate the location; controlling a speaker to provide an aural indicator to indicate the location; controlling a light to indicate the location; controlling a haptic device to indicate the location; and, controlling a laser device to indicate the location.

The phase shifter can be configured to be enabled and disabled such that the minima can be turned on and off; and the method can further comprise detecting the RF transponder in the first position with the phase shifter disabled and the, minima removed, and determining the position of the RF transponder in the second position with the phase shifter enabled and the minima turned on.

For detecting the RF transponder in the first position, a given antenna of the phased array can be enabled to be on while remaining antennas are enabled to be off in the first position, thereby turning the minima off, and in the second position, the remaining antennas can be further enabled to be on, with the at least one antenna phase shifted, thereby turning the minima on.

Yet another aspect of the specification provides a computing device comprising: a phased array of antennas enabled to transmit and receive power at a given frequency for communicating with a radio frequency (RF) based-tracking device, the phased array being movable; a phase shifter for providing a phase shift to at least one antenna of the phased array to provide a minima in a main radiated lobe of the phased array; and a processing unit enabled to: detect the RF transponder via the main radiated lobe of the phased array of antennas in a first position; and determine a position of the RF transponder when the phased array is moved to a second position where a signal from the RF transponder is minimized, the position of the RF transponder determined to be along an axis of the minima in the second position.

Another aspect of the specification provides a computer program product, comprising a computer usable medium having a computer readable program code adapted to be executed to implement a method comprising: a phased array of antennas enabled to transmit and receive power at a given frequency for communicating with a radio frequency (RF) transponder, the phased array being movable; and, a phase shifter for providing a phase shift to at least one antenna of the phased array to provide a minima in a main radiated lobe of the phased array, such that when the phased array is moved from a first position, for detecting the RF transponder via the main radiated lobe, to a second position, where a signal from the RF transponder is minimized, a position of the RF transponder determined to be along an axis of the minima in the second position.

BRIEF DESCRIPTIONS OF THE DRAWINGS

For a better understanding of the various implementations of the invention described herein and to show more clearly how they may be carried into effect, reference will now be made, by way of example only, to the accompanying drawings in which:

FIG. 8 depicts a perspective view of the handheld device of FIG. 6A in use in a location associated with a supply chain, according to non-limiting implementations.

Figure 12B:
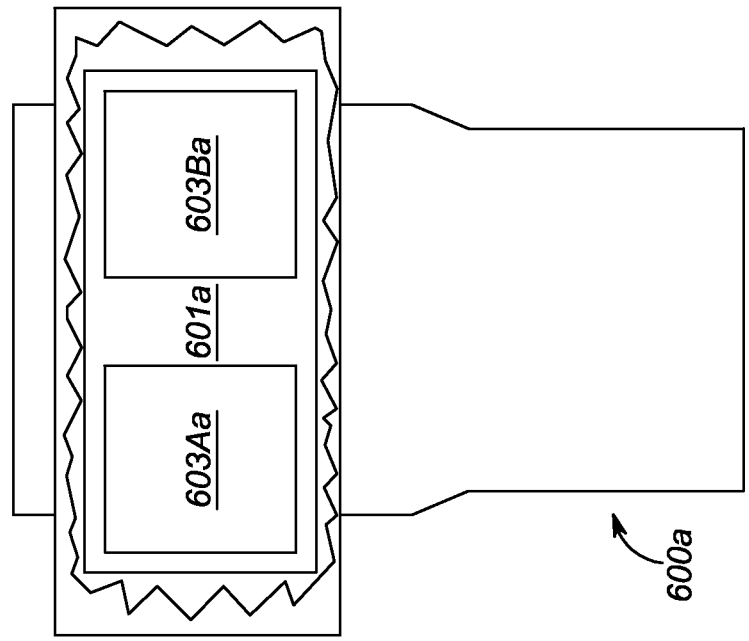
FIGS. 12A and 12B depicts a front view and a rear cutaway view, respectively, of a handheld device apparatus for determining the position of a radio-frequency (RF) transponder, according to non-limiting implementations.
Figure 12A:
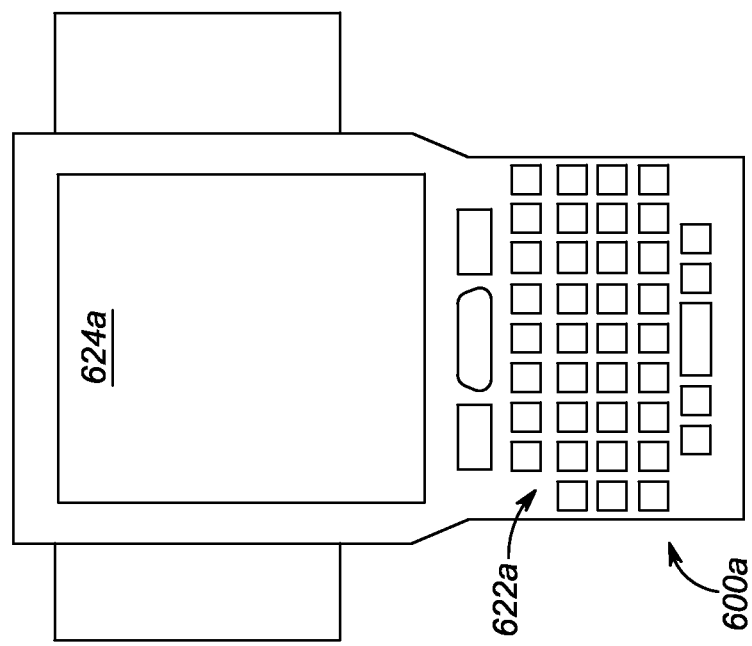

FIGS. 13 and 14 each depict a rear view of alternative implementations of the handheld device of FIG. 12A.

Figure 15:
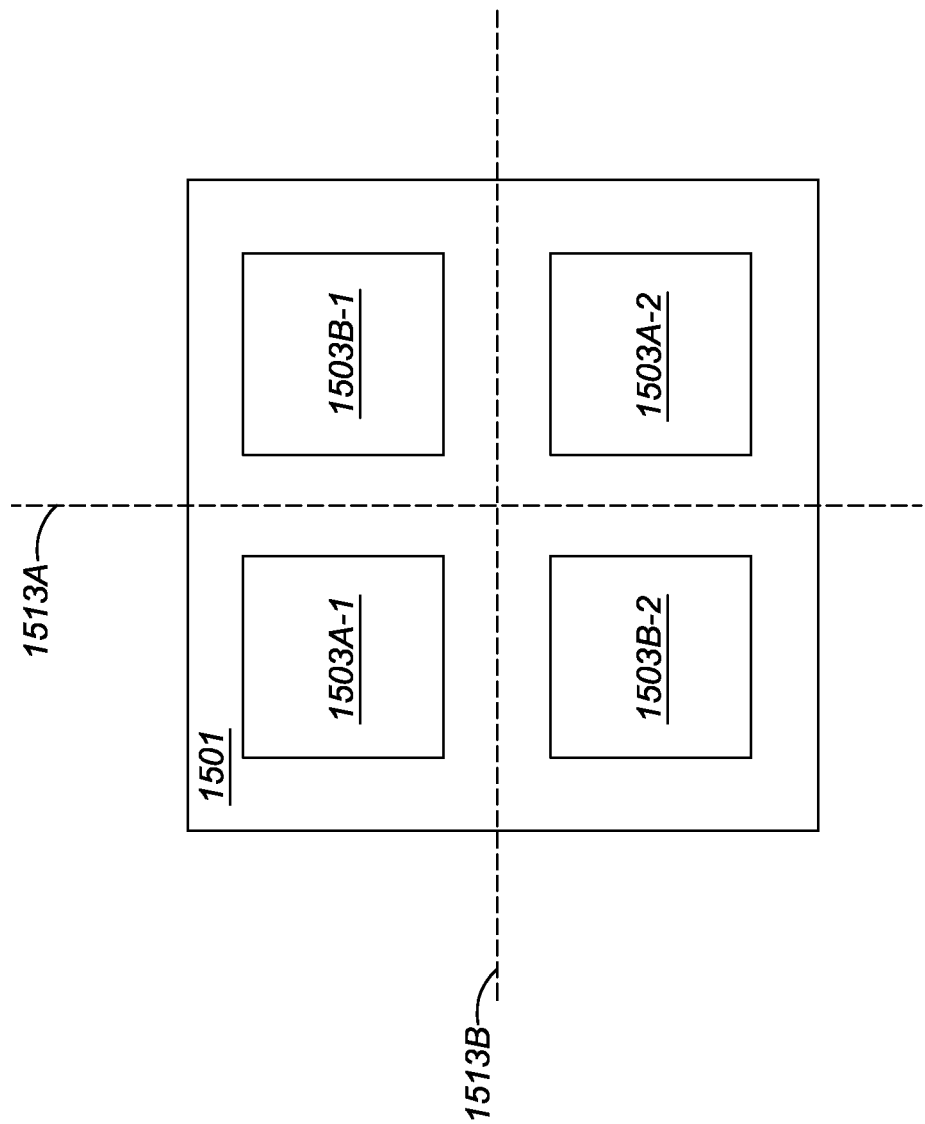

FIG. 15 depicts a phased array for determining a location of a radio-frequency (RF) transponder in two dimensions, according to non-limiting implementations.

Figure 6B:
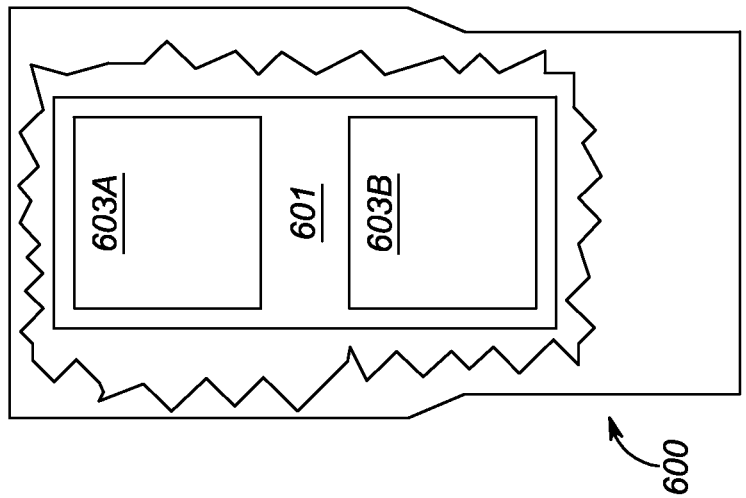
FIGS. 6A and 6B depicts a front view and a rear cutaway view, respectively, of a handheld device apparatus for determining the position of a radio-frequency (RF) transponder, according to non-limiting implementations.
Figure 6A:
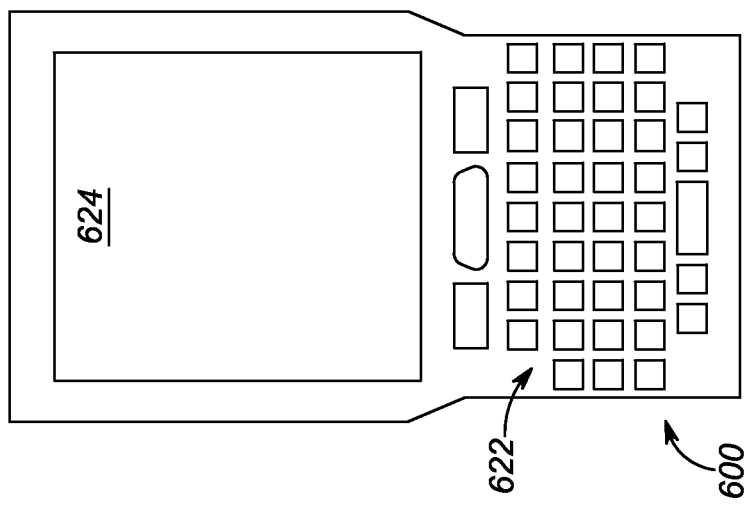
Figure 16:
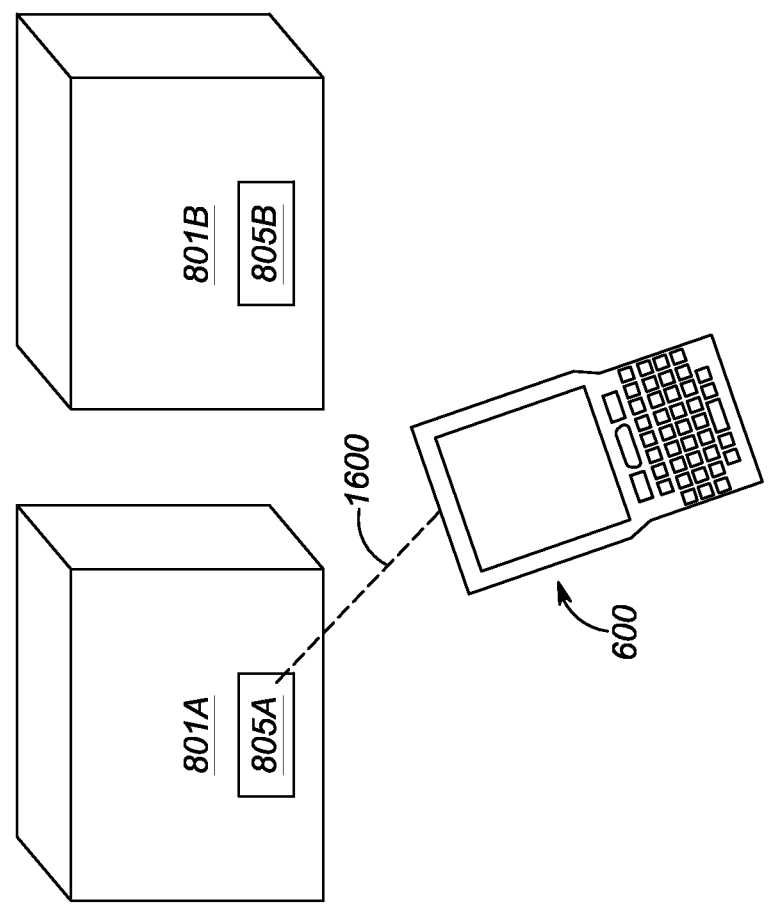

FIG. 16 depicts a perspective view of the handheld device of FIG. 6A in use in a location associated with a supply chain, and in a detection position, according to non-limiting implementations.

Figure 17:
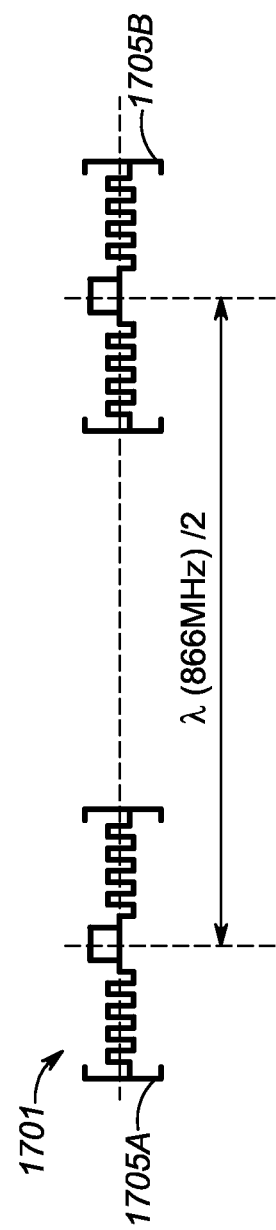

FIG. 17 depicts a phased array for determining a location of a radio-frequency (RF) transponder in two dimensions, according to non-limiting implementations.

Figure 18:
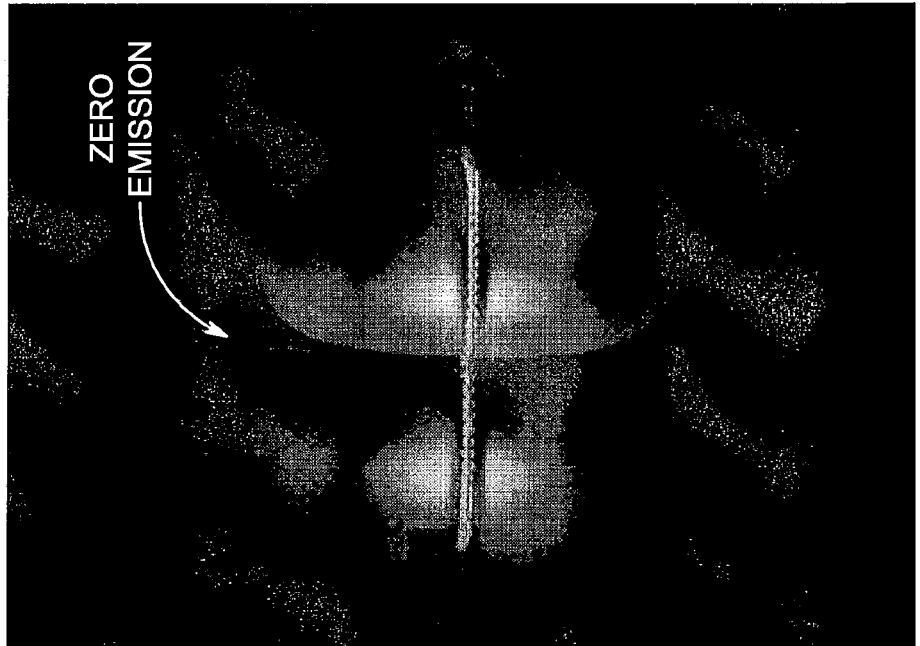

FIG. 18 depicts a three dimensional far field radiation pattern of the phased array of FIG. 17, according to non-limiting implementations.

Figure 19:
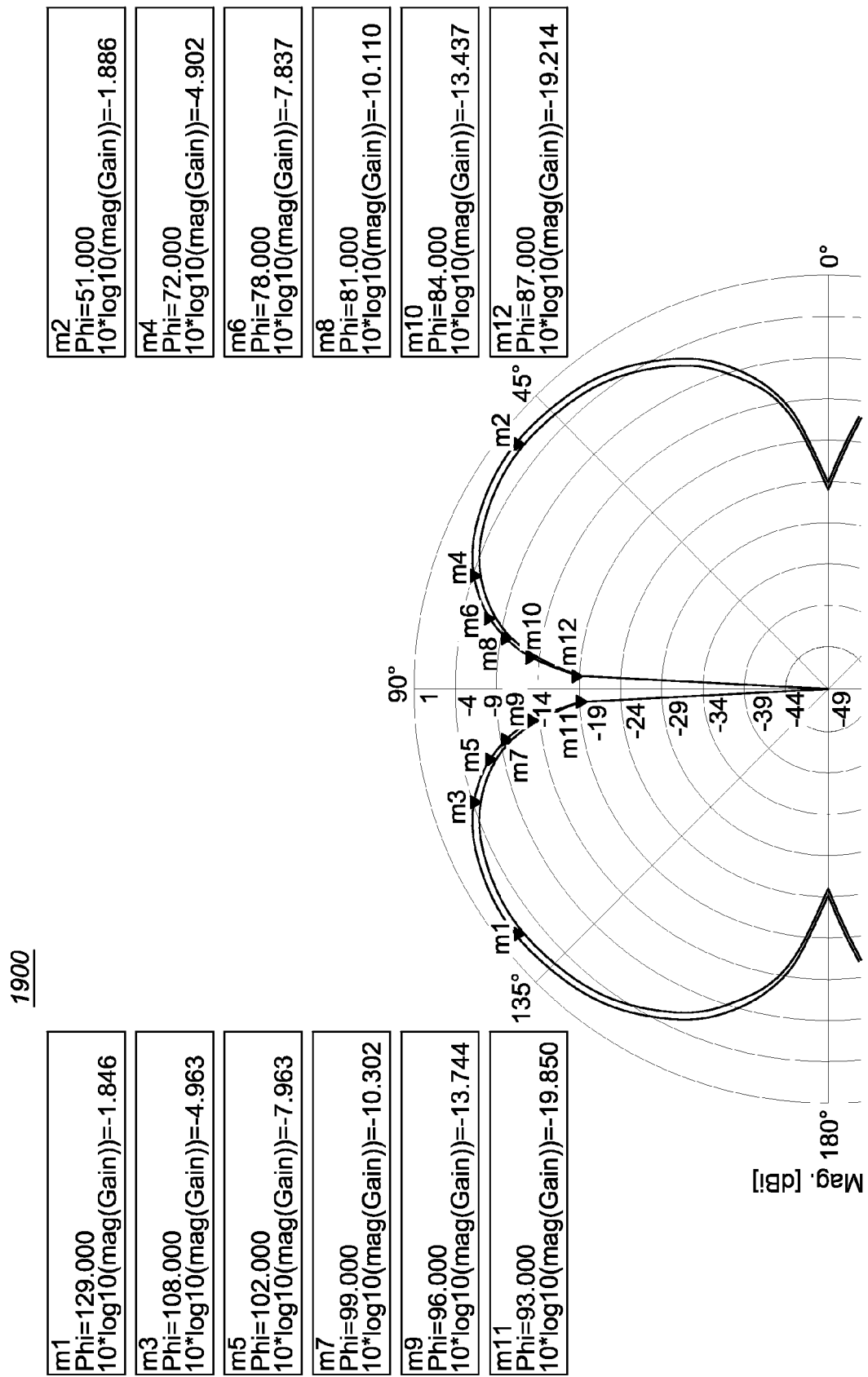

FIG. 19 depicts a two dimensional cut of the far field radiation pattern of the phased array of FIG. 18, according to non-limiting implementations.

DETAILED DESCRIPTION

Figure 1:
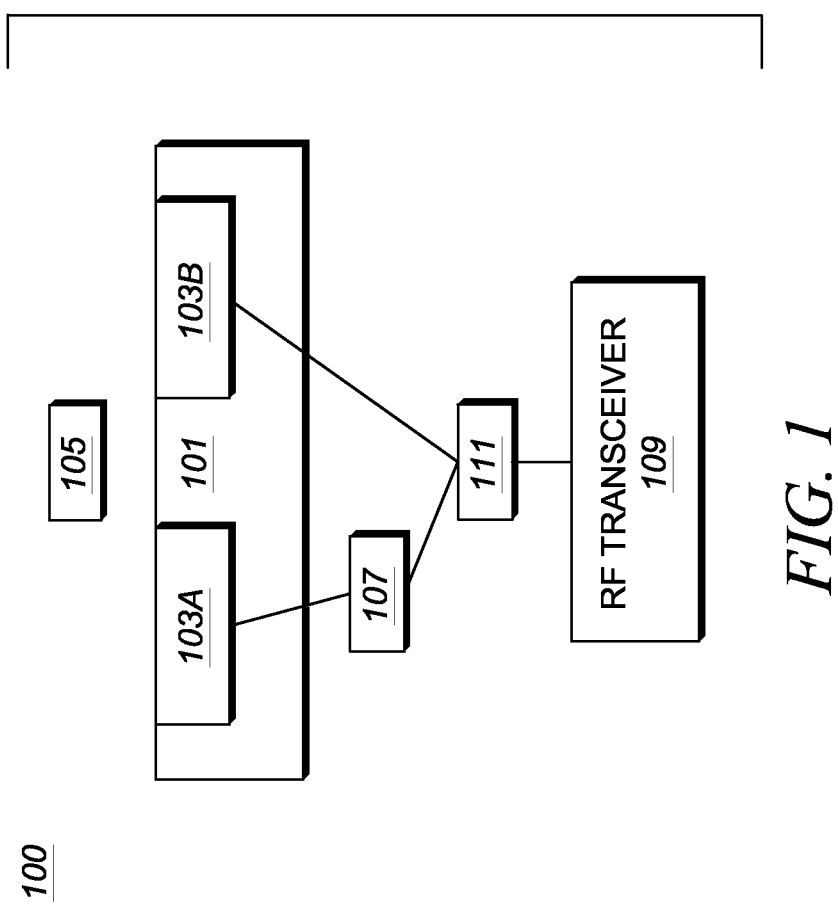
FIG. 1 depicts an antenna apparatus for determining the position of a radio-frequency (RF) transponder, according to non-limiting implementations.

FIG. 1 depicts an antenna apparatus 100 comprising a phased array 101 of antennas 103A, 103B enabled to transmit and receive power at a given frequency for communicating with a radio-frequency (RF) transponder 105, phased array 101 being moveable, including but not limited to rotatable. RF transponder 105 will also be referred to hereafter as transponder 105; in specific non-limiting implementations, transponder 105 comprises an RFID (radio-frequency identification) tag, however it is appreciated that transponder 105 is not to be limited to RFID tags and that any suitable RF transponder is within the scope of present implementations; including but not limited to RF based tracking devices, ZigBee™ based tracking devices, active RFID tags, passive RFID tags, semi-active RFID tags, and the like.

Antenna apparatus 100 further comprises a phase shifter 107 for providing a phase shift to at least one antenna, for example antenna 103A of phased array 101, as will presently be explained. Antennas 103A, 103B will also hereafter be referred to collectively as antennas 103 and generically as an antenna 103. This nomenclature will be used throughout the present description, as appropriate.

It is appreciated that phased array 101 comprises at least two antennas 103. It is further appreciated that antennas 103 can be any suitable type of antenna, including but not limited to patch antennas of any suitable shape, dipole antennas and the like. In example non-limiting implementations, antennas 103 can comprise a pair of square patch antennas of any suitable size: in specific non-limiting implementations, each square patch antenna can be approximately 55 mm along each side. It is further appreciated that power radiated by each of antennas 103 can be polarized or unpolarized as desired. When polarized, the power radiated by each of antennas 103 can be linearly polarized or circularly polarized as desired. However, it is further appreciated that the centres of each of antenna's 103 are separated by approximately half of a wavelength ($\lambda/2$) associated with the given frequency.

It is further appreciated that phased array 101 can operate at any suitable frequency, or range of frequencies, for communicating with transponder 105, including but not limited to UHF (ultra-high frequency) frequencies. It is yet further appreciated that UHF frequencies can range from approximately 300 MHz to approximately 3 GHz. When transponder 105 comprises an RFID tag, a given frequency of operation can range from approximately 800 MHz to approximately 950 MHz, as RFID tags are generally understood to operate in this range, though the actual frequency can vary by standard and/or jurisdiction. For example, transponder 105 can comprise any suitable passive or active or semiactive RFID tag, including but not limited to EPC G1G2 RFID tags and/or EPC Class 1 Gen 2 RFID tags. Such commercial RFID tags presently operate at 865-868 MHz in Europe, and 902 to 928 MHz in North America, though certain vehicular RFID tags can operate in the range of 2.4-2.5 GHz. In general it is appreciated that the actual UHF frequency is not to be considered particularly limiting and that any suitable UHF frequency is within the scope of present implementations. In particular non-limiting implementations, antennas 103 are separated by a distance in a range approximately 16 to approximately 17 cm, operating at a frequency range of approximately 880 MHz to 940 MHz.

However it is yet further appreciated that the given frequency of operation is not limited to UHF frequencies and that any suitable frequency is within the scope of present implementations. For example, a given frequency of operation can include, but is not limited to microwave ranges. Indeed, a given frequency of operation can be in a range that includes approximately 300 MHz to approximately 10 GHz.

It is yet further appreciated that in some implementations, phased array 101 can operate using unpolarized RF radiation, while in other implementations phased array 101 can operate using polarized RF radiation. In implementations where phased array 101 operates using polarized RF radiation, the RF radiation can be linearly polarized, circularly polarized, or any other suitable polarization state.

Antenna apparatus 100 further comprises any suitable RF transceiver 109 for powering antennas 103, including but limited to an RF power supply and RF receiver; hence, in present implementations, antenna apparatus 100 further comprises a power divider 111 for dividing power from RF transceiver 109 to each antenna 103. Power divider 111 can be any suitable power divider including but not limited to a Wilkinson power divider that can achieve isolation between output ports while maintaining a matched condition on all output ports; hence the condition of power supplied to each antenna 103 is similar.

However, antenna apparatus 100 can comprise any suitable number of RF transceivers, each of which can power one or more of antennas 103. When the number of RF transceivers is in a one-to-one relationship with the number of antennas 103, power divider 111 can be eliminated from antenna apparatus 100.

It is appreciated that when antenna apparatus 100 comprises, for example, two RF transceivers, the phase of each RF transceiver is coordinated to be out of phase: hence, in these implementations, a suitable phase shifter is enabled to coordinate and/or suitably shift the phase of a first RF transceiver relative to a second RF transceiver to control the phase shift there between.

In any event, in depicted implementations, it is appreciated that power from RF transceiver 109 has a given phase and that phase shifter 107 is enabled to receive power from RF transceiver 109 and shift the phase of the power before conveying the power to antenna 103A. For example, in present implementations, phase shifter 107 shifts the phase of power from RF transceiver 109 by approximately 180°. Hence, antennas 103A, 103B are approximately 180° out of phase.

Figure 2:
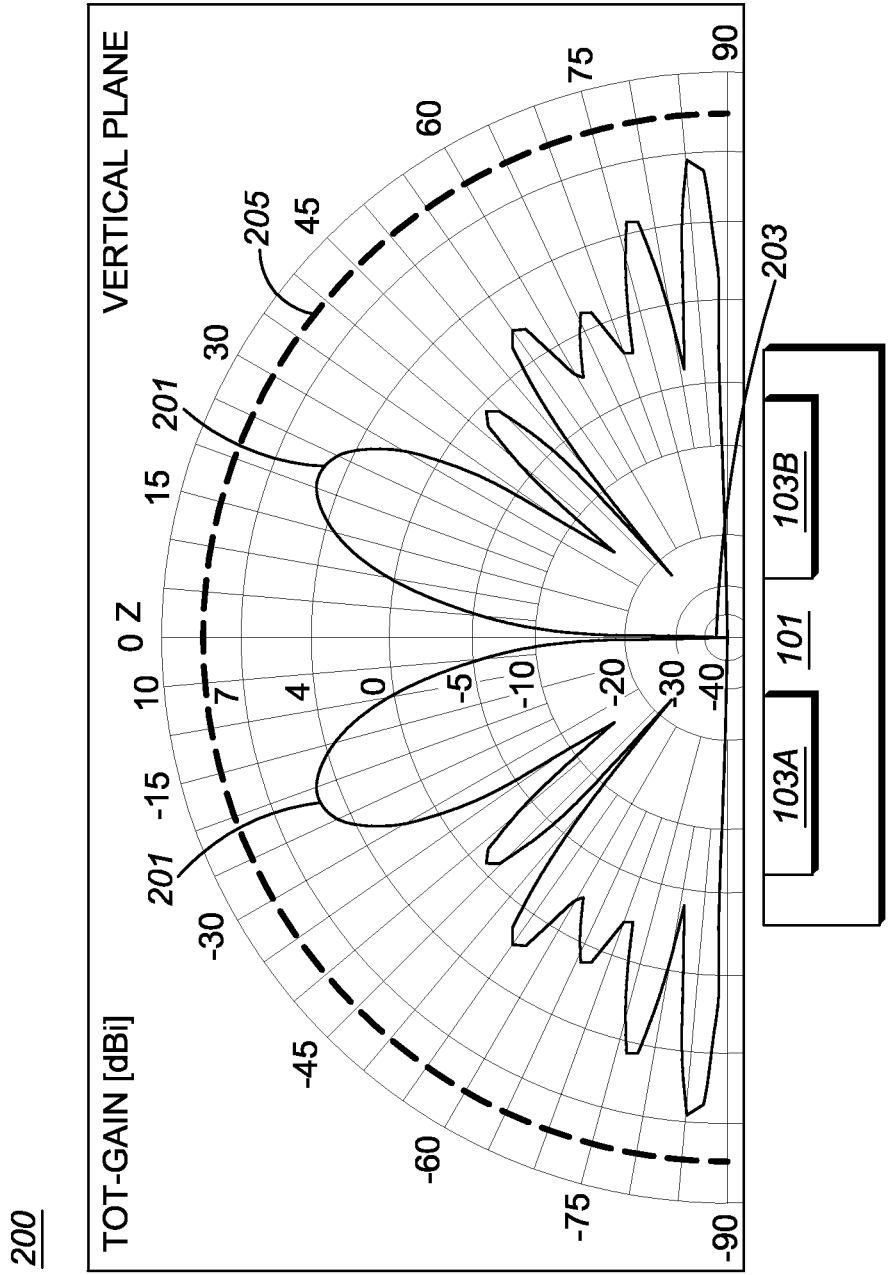
FIGS. 2 and 3 depict a radial power diagram for the antenna apparatus of FIG. 1, according to non-limiting implementations.

The effect of the phase shift is depicted in FIG. 2, which depicts a radial power diagram 200 of phased array 101, including antennas 103, with phase shifter 107 providing an approximately 180° phase shift to antenna 103A; FIG. 2 also depicts the relative positions of antennas 103. From FIG. 2, it is appreciated that a main radiated lobe 201 of phased array 101 comprises a minima 203. In depicted non-limiting implementations, minima 203 comprises a null. It is further appreciated that minima 203 is located approximately half way between antennas 103. It is further appreciated that radial power diagram 200 is shown in two dimensions only, but that actual radiated power will be over three dimensions. Specifically, minima 203 will extend linearly in and out of the page, approximately mid way between antennas 103.

In contrast, radial power diagram 200 includes a depiction of a radiation pattern 205 (i.e. the broken line) of a single antenna 103, which is substantially uniform in all directions: in other words, there is no minimum. While not depicted, it is further appreciated that a radiation pattern of phased array 101 with phase shifter 107 disabled (e.g. turned off and/or removed from antenna apparatus 100), is similar to radiation pattern 205, however with slightly more power being radiated along the 0-axis between antennas 103a and 103b.

It is further appreciated that in depicted implementations, main radiated lobe 201 has an angle of approximately +/−30°; however the angle of main radiated lobe 201 can vary depending on the shape, size, and type of each antenna 103, and can further vary with power radiated by each antenna 103. For example, in further implementations, the angle can be as large as approximately +/−45°. It is appreciated that angles referred to herein are generally measured at −3 dB on a given radiation pattern, such as radiation power diagram 200.

It is further appreciated that the device detection angle of main radiated lobe 201 increases with increasing power. For example, it is appreciated that increasing the power does not change the antenna emission pattern (e.g. the shape of the radial power diagram 200), but that antenna emission pattern becomes stronger with increasing power, and hence the detection threshold changes. Thus, the detection angle of transponder 105 changes because the detection threshold changed.

It is further appreciated that in depicted implementations, each antenna 103 is mounted in the same plane (e.g. on a flat surface). However, in other implementations each antenna 103 need not be in the same plane; in these implementations, each antenna 103 can be at any suitable angle to one another in both X and Y directions (i.e. in a direction parallel to a longitudinal axis of phased array 101 and in a direction perpendicular to the longitudinal axis of phased array 101). In other words, antenna 103A can be inclined and/or declined with respect to antenna 103B and vice versa. It is appreciated that when antennas 103 are not in the same plane, the phase shift there between could be less than 180° in order to produce minima 203.

It is further appreciated that the angle of minima 203, about the 0 degree axis, in depicted implementations has an angle of approximately +/−5° (approximately 10° total), though again this angle can vary depending on the shape, size, and type of each antenna 103, and can further vary with power radiated by each antenna 103. In other implementations, the angle of minima 203 be as wide as approximately +/−15°. In general, it is appreciated that the angle of minima 203 decreases with increasing power. However, in some implementations, a high power with a correspondingly wide angle, can be used initially to generally locate transponder 105, and the power can then be decreased to decrease the angle of minima 203, to better locate transponder 105 (e.g. phased array 101 is moved at a first power to locate transponder 105 using negative logic such that transponder 105 is determined to be in first angular range, and then phased array 101 is moved at a second power less than the first power to locate transponder 105 using negative logic, such that transponder 105 is determined to be in a second angular range that is a subset of the first angular range).

In general, the power radiated by antenna apparatus 100 can be in a range from 10-500 mW; however the power radiated by antenna apparatus 100 can be as high as approximately 2 Watts (W). However, the power output radiated by antenna apparatus 100 is not to be considered particularly limiting as it is appreciated that when transponder 105 comprises an RFID tag, the power output by an RFID system is regulated by jurisdiction: hence, the range of power can vary by jurisdiction, as can the maximum power output.

Figure 3:
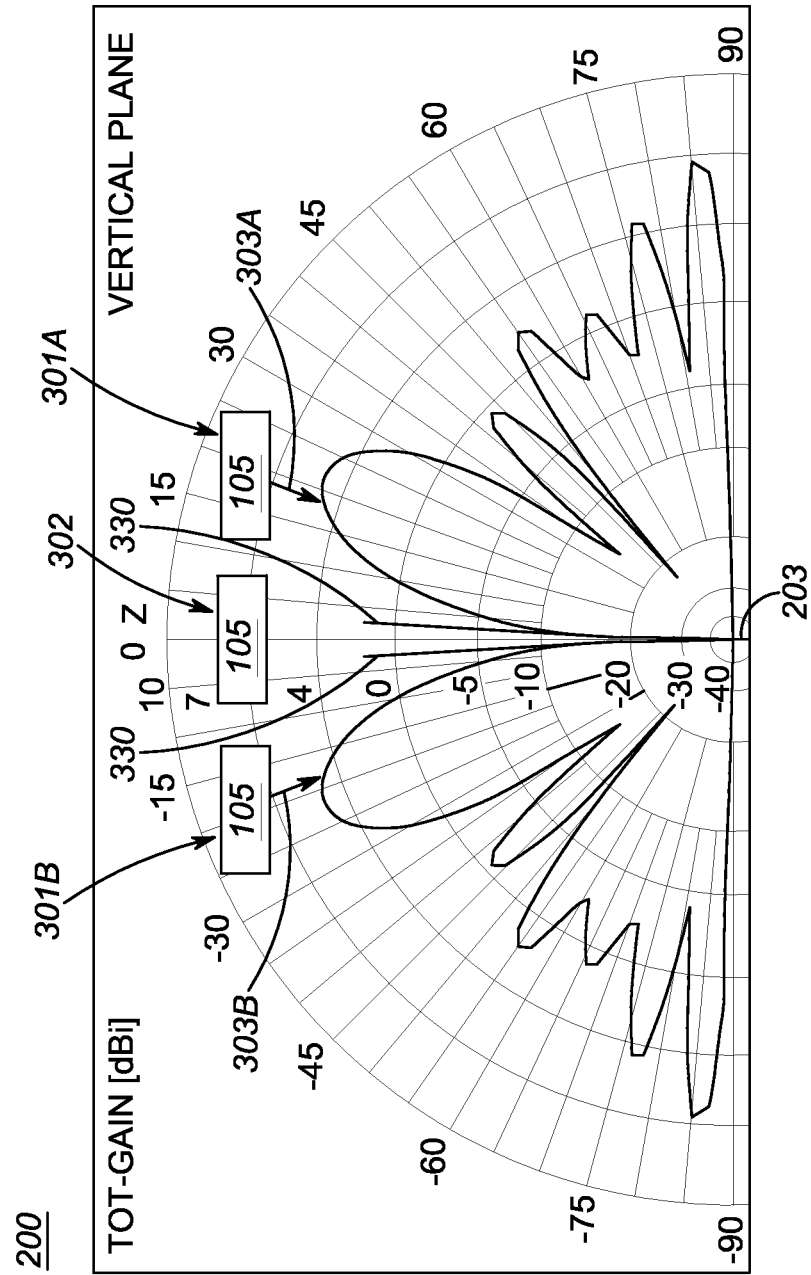
Figure 4A:
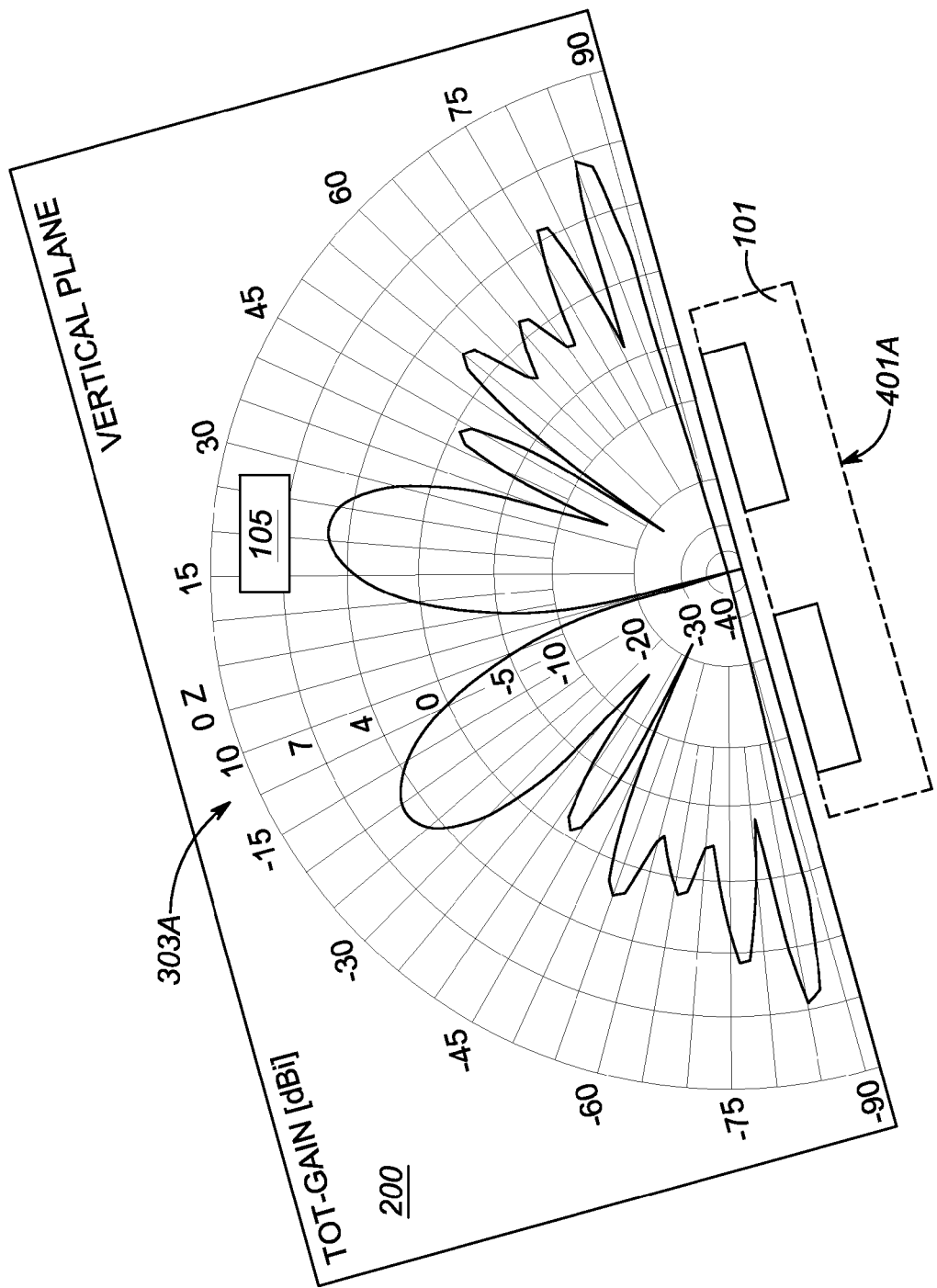
FIG. 4 depicts the antenna apparatus of claim 1, in various positions for detecting an RFID tag, according to non-limiting implementations.
Figure 4B:
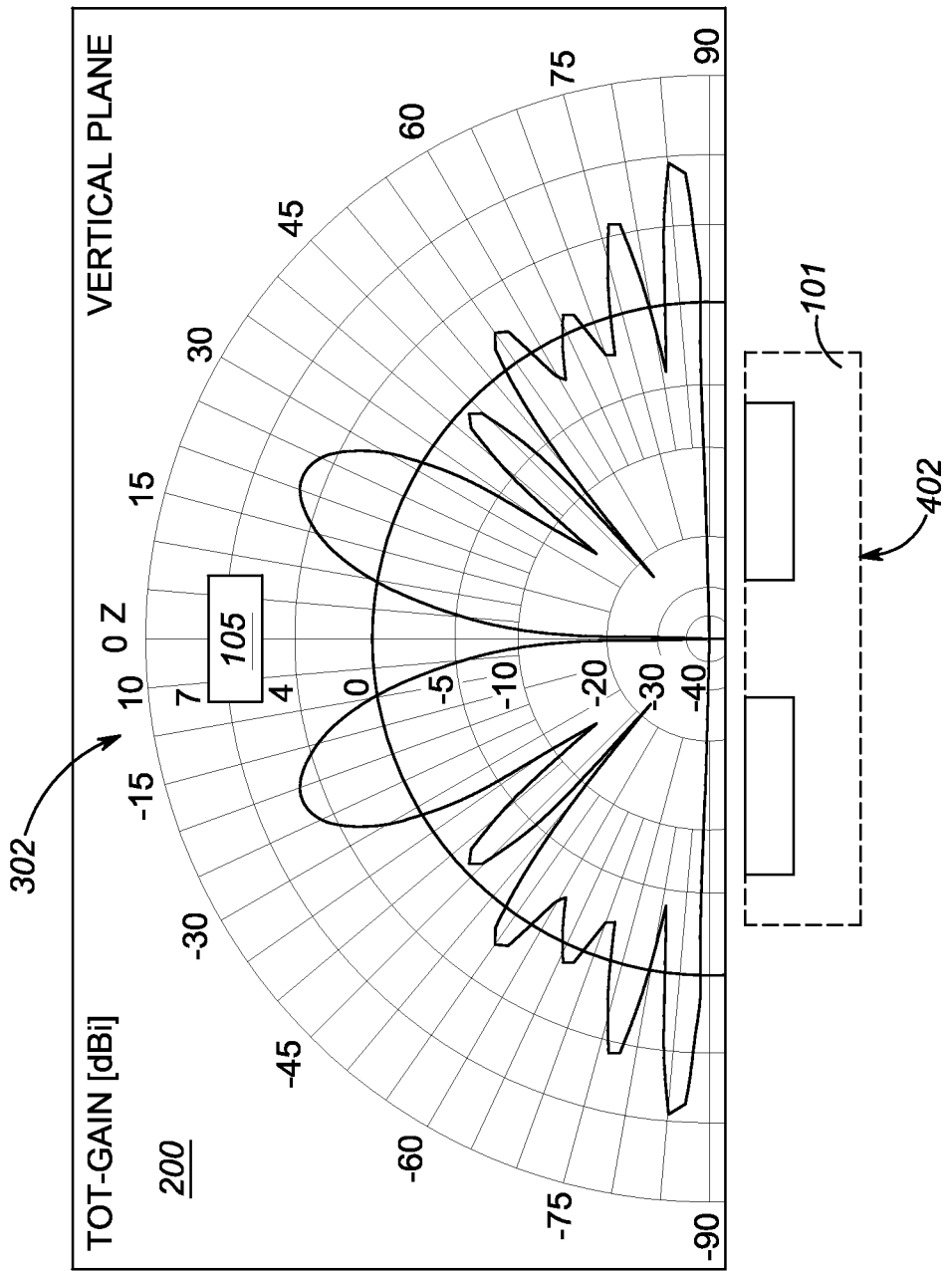
Figure 4C:
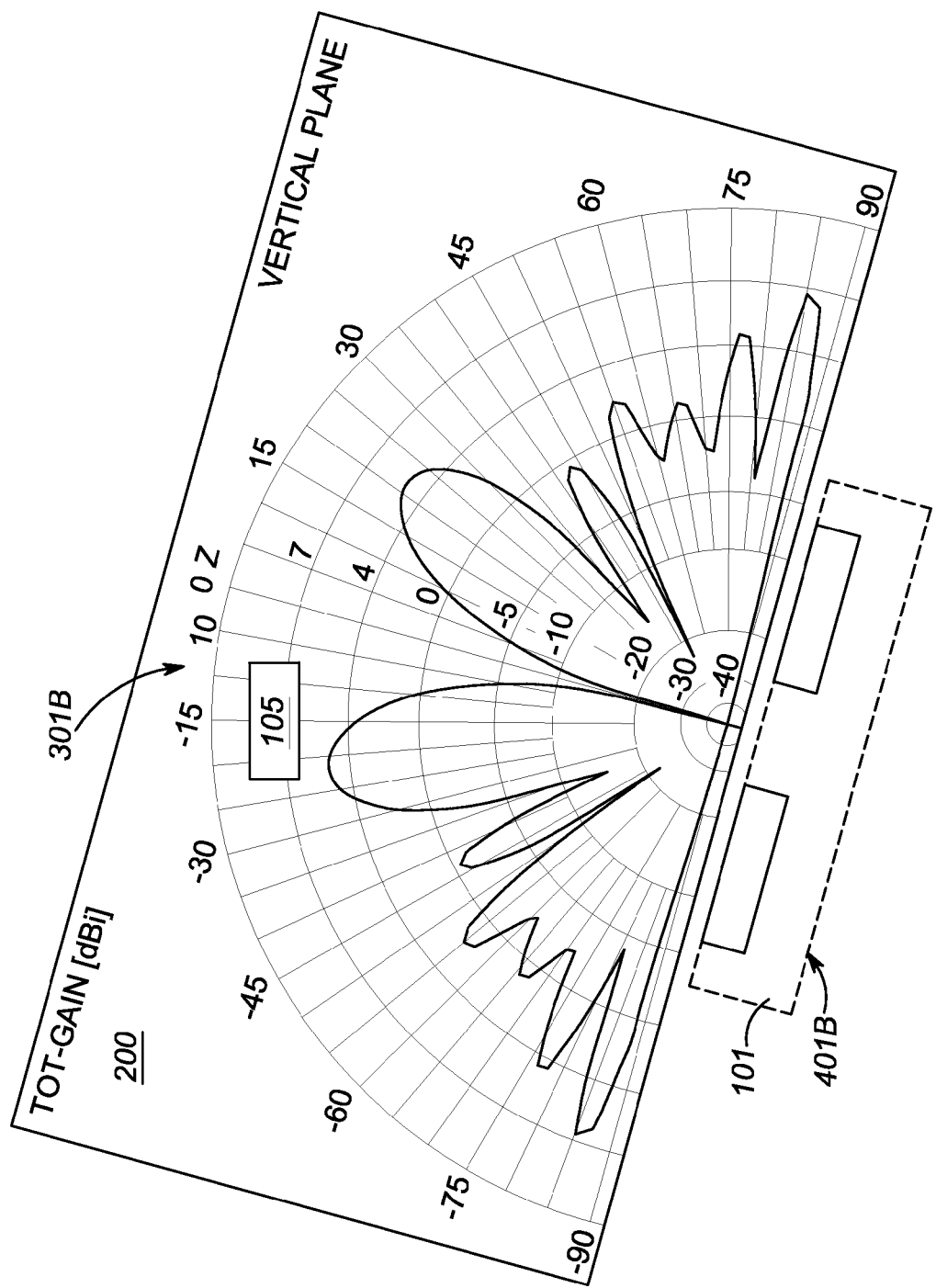

Attention is now directed to FIG. 3, which is substantially similar to FIG. 2 with like elements having like numbers, however transponder 105 is depicted at different positions 301A, 301B and 302. At positions 301A, 301B, transponder 105 is detectable via main radiated lobe 201 using techniques known to persons of skill in the art, such as RFID techniques. For example, power emitted from main radiated lobe 201 is received at transponder 105 at a given position 301A, 301B, which responsively emits a given signal 303A, 303B detected by phased array 101. With further reference to FIGS. 2 to 4, it is further appreciated that radial power diagram 200 includes side lobes that also comprise minima; however these minima are generally appreciated to not be as sharp or as deep as minima 203. Furthermore the side lobes are not as intense as main radiated lobe 201. Hence, detection of transponder 105 by side lobes and/or minima (using negative logic) of side lobes can be distinguished from detection of transponder 105 by main radiated lobe 201 and/or minima 203 using threshold values, as described in further detail below. It is appreciated that signal 303 emitted by transponder 105 can comprise data stored at transponder 105, such as data identifying items to which transponder 105 is attached, or the like. In other words, when transponder 105 is in the angle of main radiated lobe 201 but outside the angle of minima 203, transponder 105 is detectable.

In depicted implementations, transponder 105 is approximately parallel with phased array 101. However, it is appreciated that the orientation of transponder 105 is not to be considered particularly limiting. While some transponders (e.g. come RFID tags) can be generally planar, which can affect whether or not a given transponder can absorb enough energy from phased array 101 to turn "on", it is appreciated that combinations of transponders and phased arrays a given transponder (e.g. using generally omnidirectional antennas) is not generally affected by orientation are within the scope of present implementations. It is further appreciated that phased array 101 can be polarized (linearly, circularly, or the like) and that such polarization can affect orientation at which transponder 105 is detected.

However, when transponder 105 is located at position 302, i.e. within the angle of minima 203, transponder 105 is not detectable and/or power of a signal from transponder 105 at position 302 can decrease to a minimum value (such as zero power) which is not detectable by an RF receiver associated with RF transceiver 109.

Hence, using a negative logic principle, a position of transponder 105 can be detected. FIG. 3 also depicts outer axes 330 of minima 203, and it is appreciated that when an RF transponder is located using a negative logic principle the RF transponder will be located along one of axes 330 and/or any axis there between.

For example, attention is now directed to FIG. 4, which depicts phased array 101 at three angles of rotation 401A, 401B and 402 with respect to transponder 105, angles of rotation 401, 402 also referred to hereafter as positions 401, 402. It is appreciated that the underlying assumption of FIG. 4 is that the position in space of transponder 105 is fixed and that phased array 101 moves with respect to transponder 105. Hence, FIG. 4 further depicts radial power diagram 200 of phased array 101 at each position 401, 402, as well as the relative position 301, 302 of transponder 105 at each position 401, 402. It is furthermore appreciated that while main radiated lobe 201 and minima 203 are not labeled in FIG. 4, each are nonetheless present and depicted.

At position 401 of phased array 101, transponder 105 is detectable by phased array 101, as described above. However, when phased array 101 is moved from position 401 to position 402, where a signal from transponder 105 is minimized, a position of transponder 105 is determined to be along an axis of minima 203 at position 402. Hence, for example, as phased array 101 is moved, phased array 101 will first detect transponder 105 via main radiated lobe 201, acquiring the data transmitted from transponder 105, and then phased array 101 will lose signal 303 from transponder 105 as it decreases and is lost in minima 203: it is appreciated that, using a negative logic principle (i.e. when transponder 105 is not detected after first being detected), position 302 of transponder 105 will be along an axis of minima 203, or approximately normal to antennas 103 and/or phased array 101. For example, transponder 105 will be along one of axes 330 or any axis there between.

It is appreciated, however, that transponder 105 can operate in one of two modes: "on" and "off". In other words, transponder 105 generally operates according to two thresholds field strengths: a first threshold of RF radiation wherein transponder 105 turns on, and a second threshold wherein transponder 105 turns off, the first threshold higher than the second threshold. In these implementations, it is appreciated that transponder 105 turns on when located off of an axis of minima 203 (i.e. transponder 105 absorbs energy from main radiated lobe 201 and/or sides lobes) such that the RF radiation reaches at transponder 105 reaches the first threshold. It is further appreciated that transponder 105 turns off when located along an axis of minima 203 such that the RF radiation falls to the second threshold. Hence, when transponder 105 turns off, no signal is detected from transponder 105 at phased array 101 and it is determined that transponder 105 is located along an axis of minima 203.

Figure 5:
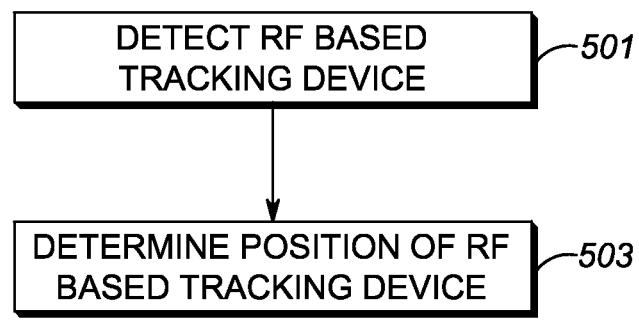
FIG. 5 depicts a method for determining the position of a radio-frequency (RF) transponder, according to non-limiting implementations.

Attention is now directed to FIG. 5 which depicts a method 500 for determining a location of an RF transponder. In order to assist in the explanation of method 500, it will be assumed that method 500 is performed using antenna apparatus 100. Furthermore, the following discussion of method 500 will lead to a further understanding of antenna apparatus 100 and its various components. However, it is to be understood that antenna apparatus 100 and/or method 500 can be varied, and need not work exactly as discussed herein in conjunction with each other, and that such variations are within the scope of present implementations.

At block 501, transponder 105 is detected via main radiated lobe 201 of phased array 101 in a first position. In some implementations, phase shifter 107 can be disabled (e.g. using any suitable switch) for block 501, such that minima 203 is removed and the main radiated lobe of phased array 101 is similar to radiation pattern 205 of FIG. 2. Alternatively, at block 501, only one of antennas 103 can be powered, and the other of antennas 103 turned off, such that the main radiated lobe of phased array 101 is similar to radiation pattern 205 of FIG. 2.

In any event, once transponder 105 has been detected, at block 503, a position of transponder 105 is determined. Specifically phased array 101 is moved, as depicted in FIG. 4, such that a signal from transponder 105 is minimized and/or disappears, and the position of transponder 105 determined to be along an axis of minima 203.

With further reference to FIGS. 2 to 4, it is appreciated that radial power diagram 200 includes side lobes that also comprise minima; however these minima are generally appreciated to not be as sharp or as deep as minima 203. Furthermore the side lobes are not as intense as main radiated lobe 201. However, as described above, transponder 105 generally operates according a first threshold of RF radiation wherein transponder 105 turns on and a second threshold of RF radiation wherein transponder 105 turns off, the first threshold greater than the second threshold. Hence, in some implementations, minima in side lobes are not deep enough to cause transponder 105 to turn off. In yet other implementations, minima is side lobes can be very noisy (i.e. not as deep or as sharp as minima 203) and hence RF radiation received by transponder 105 when located in minima in the side lobes can be very noisy, causing transponder to turn off and on rapidly. Such a noisy response can be detected by phased array 101 and a determination can be made that transponder 105 is not located along an axis of minima 203 due to the noisy response. In yet further implementations, transponder 105 being located along an axis of minima 203 vs. a minima of the side lobes can be distinguished by at least one of varying power to phased array 101 and moving phased array 101. For example, as the minima in side lobes are not as sharp or as symmetrical as minima 203, an increase in power of phased array 101 will cause transponder 105 to turn on when located in a minima of the side lobes, whereas transponder 105 will not turn on when located along an axis of minima 203. Similarly, small movements of phased array 101 will cause a rapid increase of RF radiation at transponder 105 when transponder 105 is located in a minima of the side lobes; hence phased array 101 can be enabled to detect sudden changes and/or rapid changes in the signal from transponder 105 and determine that transponder 105 is located at side lobes and not along an axis of minima 203. In yet further implementations, transponder 105 can first be detected with the phase shift at phased array 101 turned off (i.e. to turn transponder 105 on), and then with the phase shift at phased array 101 turned on to position transponder 105 in minima 203 by moving phased array 101. Indeed, any suitable method for distinguishing minima in side lobes from minima 203 is within the scope of present implementations.

It is yet further appreciated that minima 203 is positioned in a radial axis of radial power diagram 200, and hence a scan for RF transponders is generally performed around the radial axis: devices which incorporate a phased array similar to phased array 101, such as hand held terminals, can be de designed such that a natural rest position of such devices is with the radial axis facing forward. In these implementations, the side lobes are not generally a factor as only RF based devices that are generally in front of the phased array (i.e. along and/or proximal to the radial axis of the phased array) are detected.

Alternatively, phased array 101 can be moved from position 401A through position 402 and further to position 401B (or vice versa), and then back to position 402. The detection of signal 301 starting at a maximum value, decreasing to a minimum, and then increasing again to approximately the maximum again, can indicate that transponder 105 is located approximately in front of phased array 101, rather than off to one side.

Figure 7:
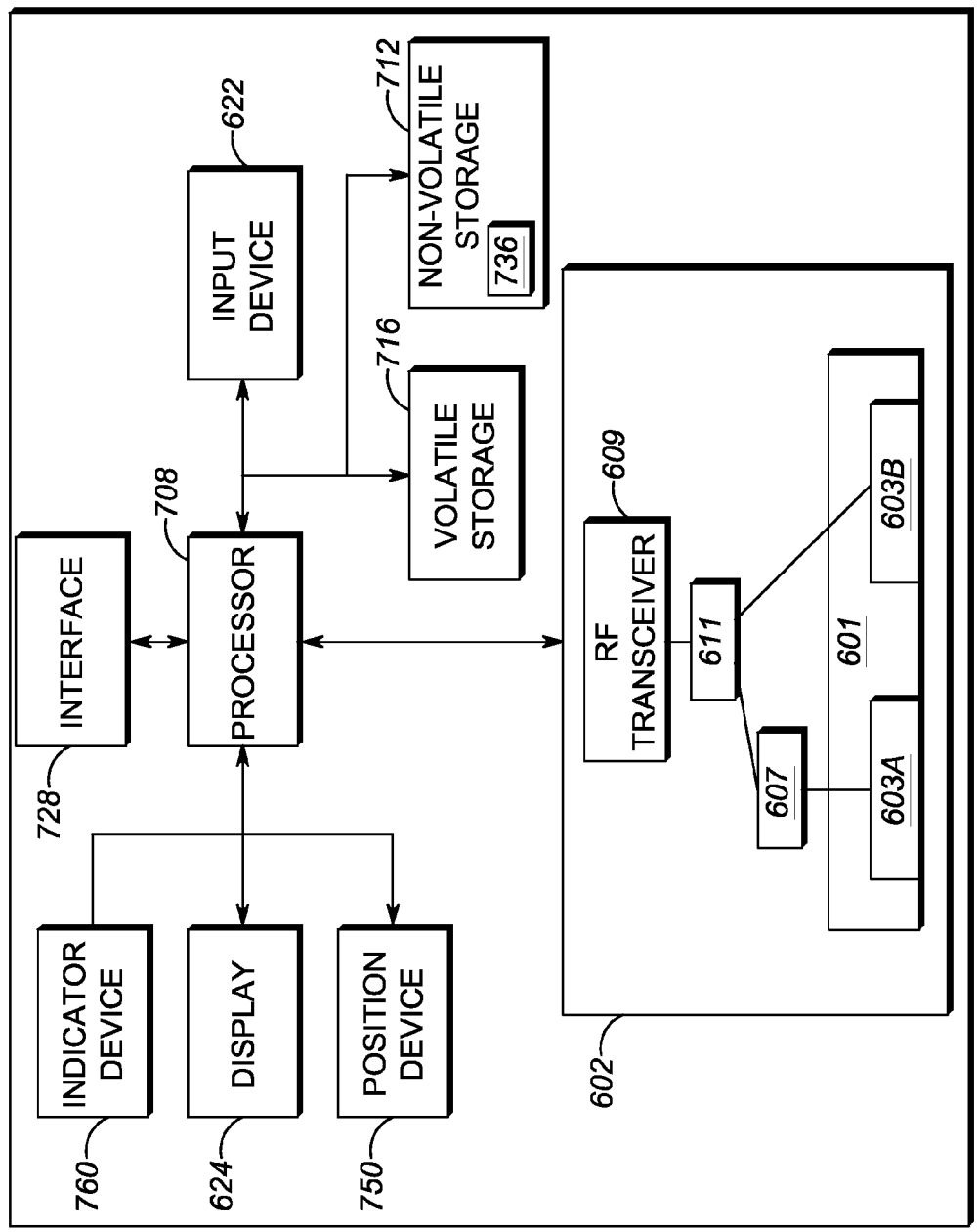
FIG. 7 depicts a schematic diagram of the handheld device of FIG. 6A, according to non-limiting implementations.

It is appreciated that each of the methods described above can be performed using suitable electronics, such as a processor (e.g. as described below with reference to FIG. 7), for detecting transponder 105 and determining the location of transponder 105, as will presently be explained. For example, specific non-limiting implementations will now be described with reference to FIGS. 6A, 6B, and 7 to 11. FIGS. 6A, 6B and 7 depicts a front view, a rear partial cutaway view and a schematic view, respectively, of a handheld device 600, also referred to hereafter as device 600. It should be emphasized that the structures depicted in FIGS. 6A, 6B, and 7 to 11 are purely exemplary.

Handheld device 600 comprises an antenna apparatus 602, phased array 601, antennas 603, a phase shifter 607, an RF transceiver 609 and a power divider 611 similar to antenna apparatus 100, phased array 101 and antennas 103, phase shifter 107, RF transceiver 109 and power divider 111 respectively. Device 600 further comprises at least one input device 622, a display 624, a processor 708, non-volatile storage 712, volatile storage 716, and optionally an interface for communicating with a network (e.g. such that data collected from RF transponders, including but not limited to RFID tags, can be transmitted and stored remotely and/or data associated with RF transponders can be requested, or the like).

Device 600 can be any type of suitable handheld electronic device, such as the OMNII XT device manufactured by the assignee of the present invention, enabled to collect data from RF transponders, such as transponder 105. In specific non-limiting implementations, device 600 comprises a handheld device for supply chain logistics, however in other implementations, device 600 can comprise any suitable handheld device enabled to collect data from RF transponders, including but not limited to any suitable combination of portable electronic devices, mobile computing device, portable computing devices, tablet computing devices, laptop computing devices, PDAs (personal digital assistants), cellphones, smartphones and the like. Other suitable computing devices are within the scope of present implementations.

Device 600 includes at least one input device 622. Input device 622 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 622 is received at processor 708 (which can be implemented as a plurality of processors and/or as one or more central processing units (CPUs)). Processor 708 is configured to communicate with a non-volatile storage unit 712 (e.g. Erasable Electronic Programmable Read Only. Memory ("EEPROM"), Flash Memory) and a volatile storage unit 716 (e.g. random access memory ("RAM")). Programming instructions that implement the functional teachings of device 600 as described herein are typically maintained, persistently, in non-volatile storage unit 712 and used by processor 708 which makes appropriate utilization of volatile storage unit 716 during the execution of such programming instructions. Those skilled in the art will now recognize that non-volatile storage unit 712 and volatile storage unit 716 are examples of non-transitory computer readable media that can store programming instructions executable on processor 708. It is further appreciated that each of non-volatile storage unit 712 and volatile storage unit 716 are also examples of memory units and/or memory modules.

In particular, non-volatile storage unit 712 can store an application 736 which can be processed by processor 708, application 736 for controlling antenna apparatus 602 and determine a location of an RF based tracking device.

Processor 708 can also be configured to render data at a display. Display 624 comprises any suitable one of or combination of CRT (cathode ray tube) and/or flat panel displays (e.g. LCD (liquid crystal display), plasma, OLED (organic light emitting diode), capacitive or resistive touchscreens, and the like).

Processor 708 can also connect to a network interface 728, which can be implemented in some implementations as one or more radios configured to communicate with a remote computing device (not depicted), such as a logistics server, via a communications network (not depicted). In general, it will be understood that interface 728 is configured to correspond with a network architecture that is used to implement a link with a communication network.

In some implementations, device 600 further comprises at least one position device 750 for determining a position and/or orientation and/or movement of device 600. For example, position device 600 can comprise any suitable combination of an accelerometer, a gyroscopic device, a magnetometer and/or a GPS (global positioning system) device, and the like.

In some implementations, device 600 can also comprise an indicator device 760, controllable by processor 708 to indicate a location of an RF transponder. For example, indicator device 760 can include, but is not limited to, a speaker, a light (such as an LED or the like), a haptic device (such as a vibratory motor or the like), a laser pointer, a combination thereof, or the like.

It is yet further appreciated that, while not depicted, device 600, including RF transceiver 609, is generally powered by a battery.

It should be understood that in general a wide variety of configurations for device 600 are contemplated.

With reference to FIG. 6B, it is appreciated that antennas 103 as depicted are vertically aligned and facing towards the rear of device 600 such that device 600 can be held by a user with display 624 visible thereto, and moved to detect and determine location of RF transponders, similar to transponder 105, as will hereafter be explained.

For example, as depicted in FIG. 8, device 600 can be used in a location associated with a supply chain, such as a warehouse, to locate RF based tracking transponders 105A, 805B, attached to items such as pallets 801A, 801B, respectively. It is appreciated that device 600 is located approximately half way between pallets 801. In present implementations, it will be assumed that each transponder 105 comprised data identifying a respective pallet 801, and specifically the text "PALLET A" is stored at device 805A, and "PALLET B" is stored at transponder 105B. However it is appreciated that any suitable data can be stored at transponders 105, including alphanumeric identifiers that can be cross-referenced with data stored at a remote logistics server.

Figure 9B:
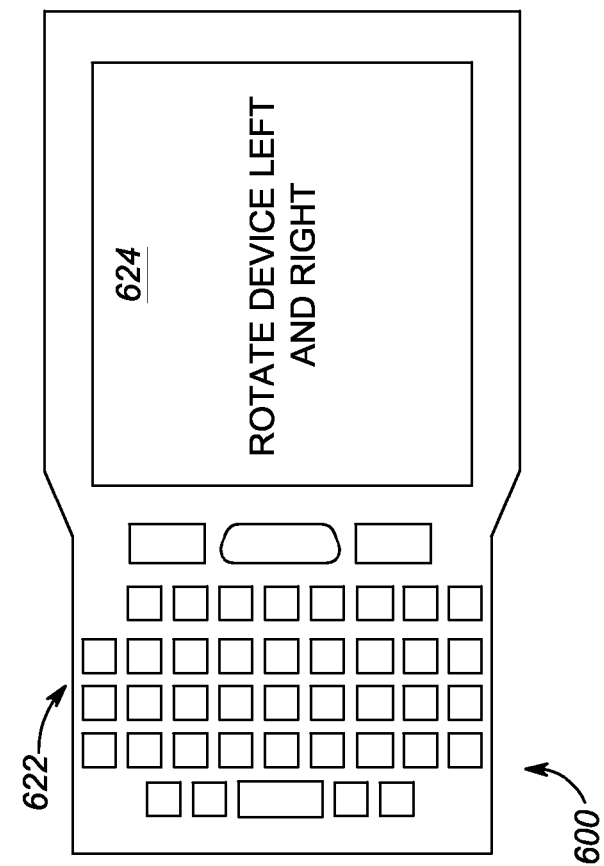
FIG. 9B depicts the handheld device of FIG. 6A in an orientation for determining a location of a radio-frequency (RF) transponder, according to non-limiting implementations.
Figure 9A:
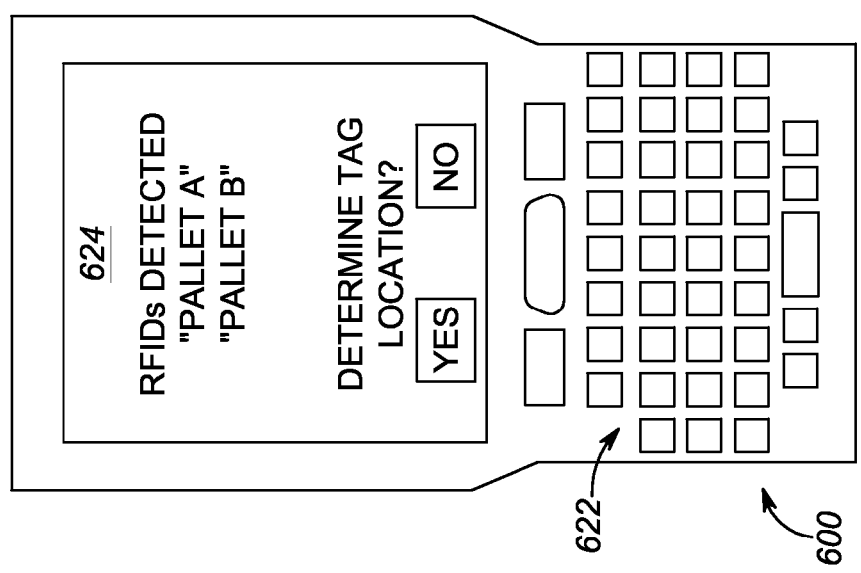
FIG. 9A depicts the handheld device of FIG. 6A in an orientation for detecting an RFID tag, according to non-limiting implementations.

In any event, as depicted in FIG. 9A, device 600 can detect transponders 105 (e.g. via the main radiated lobe of phased array 601, similar to main radiated lobe 201) and retrieve data stored thereupon upon display the retrieved data at display 624 (i.e. "PALLET A", "PALLET B"). An option to locate transponders 105A, 805B can then be provided in the form of virtual buttons "Yes" and "No". If "No" is actuated (e.g. via a pointing device and/or a touch screen device or the like), device 600 proceeds to any suitable process for supply chain logistics or the like. However, if "Yes" is actuated (e.g. via a pointing device and/or a touch screen device or the like), an indication (not depicted) to re-orient device sideways is provided at display 624 such that device 600 is oriented as in FIG. 9B. For example, text such as "Turn Device sideways to locate RFID tags" can be provided at display 624 to prompt a user to re-orient device 600.

Further, instructions to "Rotate Device Left and Right", or the like, can be provided at display 624 when device 600 is in the orientation of FIG. 6. Further, position device 750 can determine that device 600 has been re-oriented and cause processor 708 to correspondingly re-orient text at display 624. It is further appreciated that device 600 could be re-oriented 90° clockwise or counter clockwise from the orientation of FIG. 9B, as desired.

With reference to FIG. 6B and with further reference FIGS. 2-4, it is appreciated that when device 600 is oriented as in FIG. 9A, antennas 603 are aligned vertically and when device 600 is oriented as in FIG. 9B, antennas 603 are oriented horizontally (as in FIGS. 2-4). Hence, in FIG. 9B, minima 203 extends vertically from device 600, and moving device 600 left and right will cause minima 203 to sweep through signals from transponders 105.

Figure 10:
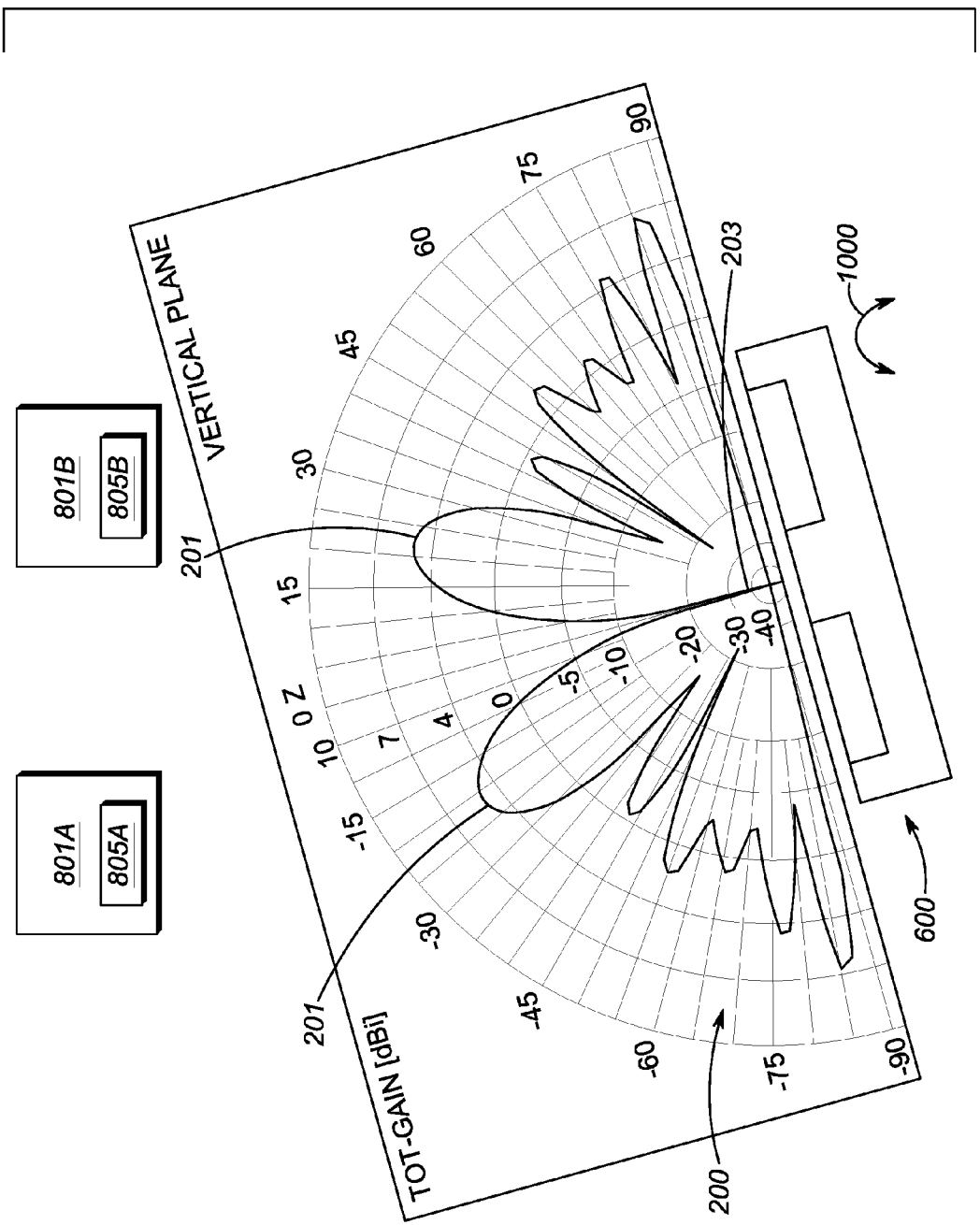
FIG. 10 depicts a top view of the handheld device of FIG. 6A in use in a location associated with a supply chain, and in an orientation for determining a location of a radio-frequency (RF) transponder, according to non-limiting implementations.

For example, FIG. 10 depicts a top view of a location with device 600 re-oriented as in FIG. 9B and turned towards transponder 105B. Arrow 1000 is indicative of device 600 being moved left and right. In any event, FIG. 10 also depicts radial power diagram 200 of phased array 601 (i.e. the radial power diagram of phased array 601 is the same, in this implementation, as the radial power diagram of phased array 101), and it is appreciated that minima 203 is pointed towards transponder 105A, while part of main radiated lobe 201 is pointed towards transponder 105B. Hence, as the signal from transponder 105A will have fallen to minimum, and indeed nulled out, processor 708 via processing of application 736, can determine that transponder 105A is in the direction of an axis of minima 203. In response, processor can cause an indication of the location of transponder 105A to be provided at device 600, by one or more of: rendering a visual indicator at display 624 to indicate the location, controlling a speaker (e.g. indicator device 760) to provide an aural indicator to indicate the location, controlling a light (e.g. indicator device 760) to indicate the location, controlling a haptic device (e.g. indicator device 760) to indicate the location and, controlling a laser device (e.g. indicator device 760) to indicate the location. In other words, when the location of transponder 105A is determined, an icon and/or text can be provided at display 624 (as in FIG. 11, described below), a sound can be displayed at a speaker, a light can turn on and/or change color, device 600 can vibrate and/or a laser pointer built into the rear of device 600 (on the same side as antennas 805B) can point perpendicularly outwards from device 600. For example, attention is directed to FIG. 16, which is substantially similar to FIG. 8 with like elements having like numbers. However, in FIG. 16, device 600 has been moved such that transponder 105A is detected, when transponder 105A is detected, device 600 emits a laser beam 1600 perpendicularly and hence in a direction of transponder 105A.

Figure 11:
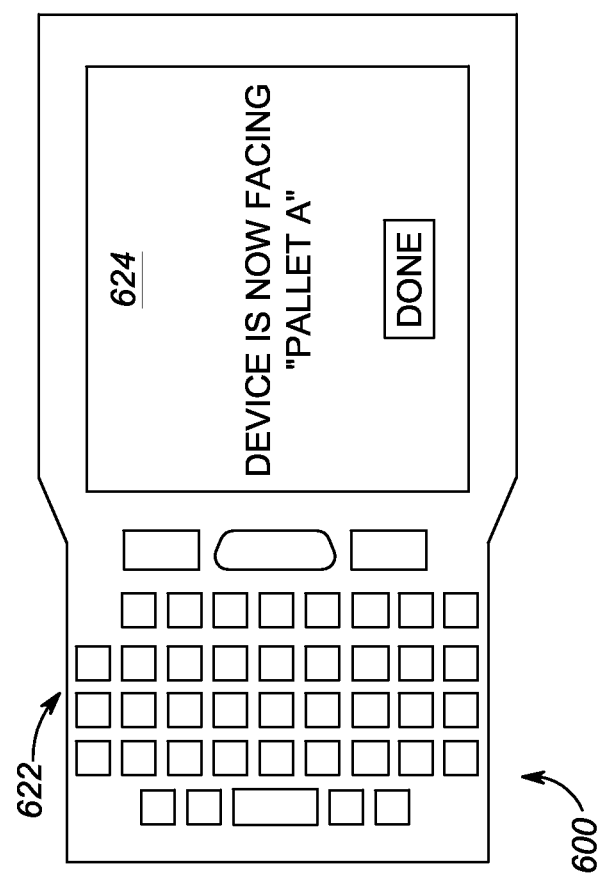
FIG. 11 depicts the handheld device of FIG. 6A, providing an indication of a location of a radio-frequency (RF) transponder, according to non-limiting implementations.

Indeed, any suitable method of indicating the location of transponder 105A is within the scope of present implementations. A specific non-limiting implementation is depicted in FIG. 11, in which display 624 is controlled to provide text "Device is now facing "PALLET A"", i.e. an indication of location and an identifier of transponder 105A, such as data retrieved from transponder 105A.

In yet further implementations, when device 600 comprises a position device 600 (i.e. any suitable combination of an accelerometer, a gyroscopic device, a magnetometer and/or a GPS device and the like) data from position device 600 can be captured (e.g. received, acquired or the like at processor 708) and stored in association with an identifier of the located RF transponder (e.g. transponder 105A and/or transponder 105B), for example at non-volatile storage device 712 and/or in any suitable database. Indeed, such data can be acquired by device 600 and transmitted and/or provided to a remote database for storage. Such associated data could be used at a later time to provide an indication of the location of a located RFID tag; hence, others could be directed to the located RFID transponder at a latter time.

Similarly, when device 600 is moved towards transponder 105B, display 624 can be controlled to provide text "Device is now facing "PALLET B"". Any suitable method of returning to a mode for reading RF transponders without determining location is within the scope of present implementations, such actuation of a virtual button "DONE", and/or re-orienting device 600 to the orientation of FIG. 9A.

In some implementations, phase shifter 607 can be disabled when not in the mode for determining the location of an RF transponder such that the radial power diagram is substantially uniform when detecting and reading RF transponders; similarly, phase shifter 607 can be enabled when in the mode for determining the location of an RF transponder. Enabling and disabling phase shifter 607 can occur automatically; alternatively, enabling and disabling phase shifter 607 can occur manually, for example, via input device 622 and/or virtual buttons rendered at display 624. In any event enabling/disabling phase shifter 607 has the effect of turning minima 203 on and off (e.g. switching between radiation pattern 205 and radial power diagram 200 comprising main radiation lobe 201 and minima 203).

Alternatively, one of antennas 603 and phase shifter 607 can be turned off and/or disabled when not in the mode for determining the location of an RF transponder such that the radial power diagram is substantially uniform when detecting and reading RF transponders; similarly, both antennas 603 and phase shifter 607 can be can be turned/on enabled when in the mode for determining the location of an RF transponder. Turning one of antennas 603 on and off when enabling and disabling phase shifter 607 can occur automatically; alternatively, turning one of antennas 603 on and off when enabling and disabling phase shifter 607 can occur manually, for example, via input device 622 and/or virtual buttons rendered at display 624. In any event, turning one of antennas 603 on and off, when enabling/disabling phase shifter 607, has the effect of turning minima 203 on and off, as well as saving power in the mode for detecting RF transponders (e.g. switching between radiation pattern 205 and radial power diagram 200 comprising main radiation lobe 201 and minima 203).

It is yet further appreciated that in some implementations, device 600 can comprise an input device for adjusting the power of phased array 601, for example a button or knob at input device 622 and/or a virtual button or knob provided at display 624. It is appreciated that adjusting the power of phased array 601 can have tradeoffs. For example, increasing power can increase the distance that an RF transponder can be detected, as well as increasing the sharpness of minima 203 (e.g. decreasing the angular spread of minima 203); however increasing power can also shorten battery life.

Attention is now directed to FIGS. 12A and 12B, which depict front and rear cutaway views, respectively of a handheld device 600a for determining location of an RF transponder. Device 600a is similar to device 600, with like elements having like numbers however with an "a" appended thereto. Device 600a differs from device 600 in that phased array 601a extends horizontally across device 600a, whereas phased array 601 extends vertically down device 600. Hence, reorienting device 600a when determining location of an RF transponder is obviated.

Attention is now directed to FIG. 13 which depicts a rear view of a handheld device 600b for determining location of an RF transponder. Device 600b is similar to device 600a, with like elements having like numbers however with a "b" appended thereto rather than an "a". Device 600b differs from device 600a in that phased array 601b moves between a horizontal in-use position (as with device 600a) and a vertical storage position. Movement between the two positions is indicated by arrow 1301, and can occur automatically via any suitable motor (such as a servo-motor) and/or manually. When manual, device 600b can provide an indication to move phased array 601b to the suitable orientation, for example instructions provided at a display device (not depicted). Phase array 601b can be spring loaded and deployed upon actuation of a suitable button or the like.

Attention is now directed to FIG. 14 which depicts a rear view of a handheld device 600c for determining location of an RF transponder. Device 600c is similar to device 600b, with like elements having like numbers however with a "c" appended thereto rather than a "b". Device 600c differs from device 600b in that the phased array is deployed on two arms 601c-1 and 601c-2, each of which swing between a horizontal in-use position and a vertical storage position. Movement between the two positions is indicated by arrows 1401, and can occur automatically via any suitable motor (such as a servo-motor) and/or manually. When manual, device 600c can provide an indication of moving arms 601c-1, 601c-2 to the suitable orientation, for example via instructions provided at a display device (not depicted). Arms 601c-1 and 601c-2 can be spring loaded and deployed upon actuation of a suitable button or the like.

Attention is now directed to FIG. 15 which depicts a phased array 1501 that comprises a first pair of antennas 1503A-1, 1503B-1, and a second pair of antennas 1503A-2, 1503B-2, each pair similar to antennas 103A, 103B, with one set of diagonally opposed antennas (e.g. 1503A-1 and 1503A-2) being approximately 180° out of phase with the other set of diagonally opposed antennas (e.g. 1503B-1 and 1503B-2) such that a radial power diagram comprises a first minima 1513A disposes vertically between (for example) 1503A-1, 1503B-1 and a second minima 1513B disposed horizontally between (for example) 1503A-1, 1503B-2, second minima 1513B being perpendicular to first minima 1513A. It is appreciated that the intersection point of minima 1513A and 1513B comprises a point where an RF transponder cannot be detected hence, using a negative logic principle, when a signal from an RF transponder falls to a minimum in both the horizontal and vertical directions, the RF transponder is located in a line that extends perpendicularly from the intersection point. Hence the RF transponder can be located in at least two spatial dimensions. Alternatively, and RF transponder can be located using one of minima 1513, in one spatial direction.

It is further appreciated that an antenna apparatus for detecting and locating RF transponders can comprise a phased array of any suitable number antennas, each of which are provided with a suitable phase shift relative to the other antennas to provide at least one minima in the main radiated lobe and/or to focus a main lobe to create a minima. Hence, while phased array 101 comprises two antennas 103 and phased array 1501 comprises four antennas 1503, other implementations of antennas apparatus can comprise any suitable number of antennas to provide at least one minima. It is furthermore appreciated, that the any suitable number of antennas can be odd or even in number; hence, while pairs of antennas have been described herein, antennas of a phased arrays in other implementations need not be arranged in pairs.

Hence, in contrast to other antennas apparatus for detecting RF transponders, antennas apparatus of present implementations enable a position of an RF transponder to be located.

It is yet further appreciated that while movement of antenna apparatus and/or phased arrays described herein has been described as a manual process, in yet other implementations, movement of antenna apparatus and/or phased arrays described herein can be automatic. For example, antenna apparatus and/or phased arrays described herein can be mounted to a rotational jig, for example a 2-axis jig or a 3-axis jig, which can be controlled in a feedback loop to move an antennas apparatus and/or a phased array to minimize a signal from an RF transponder, and thereby determine the location of the RF transponder. Such apparatus can be used in supply chain locations to determine locations of RF transponders, and/or in any other implementations where an RF transponder is to be located.

It is yet further appreciated that while heretofore, movement of antenna apparatus and/or phased arrays has been described as either a manual and/or mechanical process, yet further implementations comprise electronic control of antenna apparatus and/or phased arrays: in other words, the phase can be controlled electronically, creating an automatic electronic movement (including but not limited to electronic rotated), without any manual or mechanical movement.

While antennas described herein have been patch antennas, present implementations are not limited to patch antennas but can include any suitable antenna. For example, attention is directed to FIG. 17 which depicts a layout of a phased array 1701 comprising two dipole antennas 1705A, 1705B, each comprising a printed circuit of copper traces; it is appreciated that the copper traces are not fully linear, and the lines are folded to address space limitations and for impedance matching. In specific non-limiting implementations, antennas 1705 operate at a frequency of 866 MHz and are separated by a distance of 17.32 cm (i.e. half of a wavelength of 34.64 cm at 866 MHz), with one of antennas 1705A, 1705B being 180° out of phase with the other of antennas 1705A, 1705B. A three-dimensional far field radiation pattern 1800 of phased array 1701 is depicted in FIG. 18, and an associated two-dimensional cut 1900 of pattern 1800 is depicted in FIG. 19. From FIGS. 18 and 19 it is appreciated that pattern 1800 of phased array 1701 comprises a zero emission point along a radial axis and hence phased array 1701 can be used to detect RF transponders using negative logic as described above. Indeed, it is appreciated that any suitable phased array of any suitable type of antennas can be used to detect RF transponders.

Furthermore, as will now be appreciated, phase shifter 107, 607, can comprise any suitable phase shifter means for introducing a phase shift between antennas 103, 603, 1503, 1705 in order to produce a minima there between in a radiation pattern, including but not limited to electronic apparatus, mechanical apparatus (e.g. tilting etc. of antennas 103, 603, 1503, 1705) and the like. It is yet further appreciated that phase shifter 107, 607 can be a separate device as depicted herein, and/or can alternatively be integrated with phased array 101, 601, 1501, 1701.

Those skilled in the art will appreciate that in some implementations, the functionality of antenna apparatus 100 and device 600 can be implemented using pre-programmed hardware or firmware elements (e.g., application specific integrated circuits (ASICs), electrically erasable programmable read-only memories (EEPROMs), etc.), or other related components. In other implementations, the functionality of antenna apparatus 100 and device 600 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. An antenna apparatus comprising:
   a phased array of antennas configured to transmit and receive power at a given frequency and configured to communicate with a radio frequency (RF) transponder, the phased array being movable;
   a phase shifter configured to provide a phase shift to at least one antenna of the phased array to provide a minimum adjacent a main radiated lobe of the phased array; and
   a processor configured to detect transmission from the RF transponder via the main radiated lobe at a first position wherein when the phased array is moved from the first position to a second position, at the second position where a signal from the RF transponder is minimized, the processor is configured to determine a position of the RF transponder to be:
      along an axis of the minimum in the second position based on a rate of change in the signal from the RF transponder during a movement of the phased array; or
      removed from the axis of the minimum in the second position based on the rate of change in the signal from the RF transponder during the movement of the phased array,
   wherein the processor is further configured to determine when the position of the RF transponder is along the axis of the minimum, and in response, providing an indication of the position of the RF transponder, wherein providing the indication of the position of the RF transponder comprises at least one of:
      rendering a visual indicator at a display to indicate the position;
      controlling a speaker to provide an aural indicator to indicate the position;
      controlling a light to indicate the position;
      controlling a haptic device to indicate the position; and
      controlling a laser device to indicate the position.

2. The antenna apparatus of claim 1, wherein the minimum comprises a null and no response is received from the RF transponder when the RF transponder is located along the axis of the minimum in the second position.

3. The antenna apparatus of claim 1, wherein the phase shift is 180°.

4. The antenna apparatus of claim 3, wherein the phased array comprises a first pair of antennas, wherein the centers thereof are separated by half of a wavelength associated with the given frequency.

5. The antenna apparatus of claim 3, wherein the phased array further comprises a second pair of antennas laterally displaced from the first pair, one antenna of the second pair configured to be out of phase with the remaining antenna of the second pair providing a second minimum in the main radiated lobe perpendicular to the minimum such that the RF transponder can be located in at least two spatial dimensions.

6. The antenna apparatus of claim 1, further comprising: at least one RF transceiver for powering the phased array.

7. The antenna apparatus of claim 6, wherein the at least one RF transceiver is common to all antennas of the phased array, and further comprising a power splitter for splitting power from the at least one RF transceiver to all the antennas of the phased array.

8. The antennas apparatus of claim 1, wherein the phase shifter is configured to be enabled and disabled such that the minimum can be turned on and off, and such that the RF transponder can be detected in the first position with the phase shifter disabled and the minimum removed, and the position of the RF transponder determined in the second position with the phase shifter enabled and the minimum turned on.

9. The antenna apparatus of claim 1, wherein, for detecting the RF transponder in the first position, a given antenna of the phased array is enabled to be on while remaining antennas are enabled to be off in the first position, thereby turning the minimum off, and in the second position, the remaining antennas are further enabled to be on, with the at least one antenna phase shifted, thereby turning the minimum on.

10. The antenna apparatus of claim 1, further comprising a handheld device for providing data received in the signal from the RF transponder and providing an indication of the position of the RF transponder at a display, the phased array integrated with the handheld device.

11. The antenna apparatus of claim 1, where the given frequency is in at least one of a range of 300 MHz and 100 GHz, and a range of 800 MHz to 950 MHz.

12. A method comprising:
  detecting, by a processor of a handheld device, transmission from an RF transponder via a main radiated lobe of a phased array of antennas in a first position, the phased array is configured to transmit and receive power at a given UHF (ultra high frequency) frequency and configured to communicate with the RF transponder, the phased array being moveable;
  determining, by the processor, a position of the RF transponder when the phased array is moved to a second position where a signal from the RF transponder is minimized, wherein at least one antenna of the phased array phase is shifted using a phase shifter to provide a minimum in the main radiated lobe and the position of the RF transponder is determined to be:
    along an axis of the minimum in the second position based on a rate of change in the signal from the RF transponder during a movement of the phased array; or
    removed from the axis of the minimum in the second position based on the rate of change in the signal from the RF transponder during the movement of the phased array; and
  providing an indication of a position of the RF transponder, wherein providing the indication of the position of the RF transponder comprises at least one of:
    rendering visual indicator at a display to indicate the position;
    controlling a speaker to provide an aural indicator to indicate the position;
    controlling a light to indicate the position;
    controlling a haptic device to indicate the position; and
    controlling a laser device to indicate the position.

13. The method of claim 12, wherein the phase shifter is configured to be enabled and disabled such that the minimum can be turned on and off, the method further comprising detecting the RF transponder in the first position with the phase shifter disabled and the minimum removed, and determining the position of the RF transponder in the second position with the phase shifter enabled and the minimum turned on.

14. The method of claim 12, wherein, for detecting the RF transponder in the first position, a given antenna of the phased array is enabled to be on while remaining antennas are enabled to be off in the first position, thereby turning the minimum off, and in the second position, the remaining antennas are further enabled to be on, with the at least one antenna phase shifted, thereby turning the minimum on.

15. A computing device comprising:
  a phased array of antennas configured to transmit and receive power at a given frequency and configured to communicate with a radio frequency (RF)-based tracking device, the phased array being movable;
  a phase shifter configured to provide a phase shift to at least one antenna of the phased array to provide a minimum in a main radiated lobe of the phased array; and
  a processing unit configured to:
    detect the RF-based tracking device via the main radiated lobe of the phased array of antennas in a first position;
    determine a position of the RF-based tracking device when the phased array is moved to a second position where a signal from the RF-based tracking device is minimized, wherein the position of the RF-based tracking device is determined to be:
      along an axis of the minimum in the second position based on a rate of change in the signal from the RF-based tracking device during a movement of the phased array; or
      removed from the axis of the minimum in the second position based on the rate of change in the signal from the RF-based tracking device during the movement of the phased array; and
    provide an indication of a position of the RF transponder, wherein providing the indication of the position of the RF transponder comprises at least one of:
      rendering visual indicator at a display to indicate the position;
      controlling a speaker to provide an aural indicator to indicate the position;
      controlling a light to indicate the position;
      controlling a haptic device to indicate the position; and
      controlling a laser device to indicate the position.

16. A computer program product, comprising a non-transitory computer usable medium having a computer readable program code adapted to be executed to implement a method comprising:
  operating a phased array of antennas configured to transmit and receive power at a given frequency and configured to communicate with a radio frequency (RF) transponder, the phased array being movable;

operating a phase shifter configured to provide a phase shift to at least one antenna of the phased array to provide a minimum in a main radiated lobe of the phased array; and operating a processor configured to detect transmission from the RF transponder via the main radiated lobe at a first position such that when the phased array is moved from the first position to a second position where a signal from the RF transponder is minimized, the processor is configured to determine a position of the RF transponder to be:

along an axis of the minimum in the second position based on a rate of change in the signal from the RF transponder during a movement of the phased array; or removed from the axis of the minimum in the second position based on the rate of change in the signal from the RF transponder during the movement of the phased array; and providing an indication of a position of the RF transponder, wherein providing the indication of the position of the RF transponder comprises at least one of:

rendering visual indicator at a display to indicate the position;

controlling a speaker to provide an aural indicator to indicate the position;

controlling a light to indicate the position;

controlling a haptic device to indicate the position; and controlling a laser device to indicate the position.

* * * * *